United States Patent
Shimizu et al.

(10) Patent No.: US 10,895,465 B2
(45) Date of Patent: Jan. 19, 2021

(54) OPTIMIZING A ROUTE SELECTION FOR A HIGHLY AUTONOMOUS VEHICLE

(71) Applicant: TOYOTA JIDOSHA KABUSHIKI KAISHA, Toyota (JP)

(72) Inventors: Takayuki Shimizu, Mountain View, CA (US); Kunihiko Kumita, Toyota (JP)

(*) Notice: Subject to any disclaimer, the term of this patent is extended or adjusted under 35 U.S.C. 154(b) by 464 days.

(21) Appl. No.: 15/782,478

(22) Filed: Oct. 12, 2017

(65) Prior Publication Data

US 2019/0113353 A1    Apr. 18, 2019

(51) Int. Cl.
   *G01C 21/34* (2006.01)
   *G05D 1/00* (2006.01)
   (Continued)

(52) U.S. Cl.
   CPC ....... *G01C 21/3484* (2013.01); *B60W 50/082* (2013.01); *B60W 50/14* (2013.01);
   (Continued)

(58) Field of Classification Search
   CPC ............ G01C 21/3484; G01C 21/3492; G01C 21/3655; B50W 50/082; B50W 50/14;
   (Continued)

(56) References Cited

U.S. PATENT DOCUMENTS 7,124,027 B1 * 10/2006 Ernst, Jr. ............... B60W 30/09
                                                       701/301
9,188,985 B1 * 11/2015 Hobbs ................ G01C 21/3682
(Continued)

FOREIGN PATENT DOCUMENTS

JP      2012-164258 A     8/2012
JP      PO2017-032421     2/2017
(Continued)

OTHER PUBLICATIONS

JPO, Office Action for Japanese Patent Application No. 2018-189220, dated Aug. 20, 2019, 3 pages.
JPO, Office Action (with English translation) for Japanese Patent Application No. 2018-189220, dated Mar. 3, 2020, 3 pages.

*Primary Examiner* — Anne Marie Antonucci
(74) *Attorney, Agent, or Firm* — Burbage Law, P.C.; Jon-Michael Burbage; Elizabeth Ruzich

(57) ABSTRACT

The disclosure includes embodiments for optimizing a route selection for a highly autonomous vehicle ("HAV") which provides an automated driving service. In some embodiments, a method includes: generating a set of candidate routes for a journey; aggregating external data describing one or more external factors which limit an availability of the automated driving service while traveling along the candidate routes; determining a first value for an optimal degree of automation for traveling the journey based on a condition of the driver and the preferences of the driver; determining a plurality of second values for a plurality of possible degrees of automation for each candidate route based on the external data; and selecting an optimum route from the set of candidate routes by comparing the first value to the plurality of second values to determine which of the candidate routes has a second value which is closest to the first value.

23 Claims, 10 Drawing Sheets

(51) Int. Cl.
  *B60W 50/08*  (2020.01)
  *G06Q 10/04*  (2012.01)
  *B60W 50/14*  (2020.01)
  *G01C 21/36*  (2006.01)

(52) U.S. Cl.
  CPC ..... *G01C 21/3492* (2013.01); *G01C 21/3655* (2013.01); *G05D 1/0061* (2013.01); *G05D 1/0088* (2013.01); *G06Q 10/047* (2013.01)

(58) Field of Classification Search
  CPC ... G05D 1/0061; G05D 1/0088; G06Q 10/047
  USPC .......................................................... 701/25
  See application file for complete search history.

(56) References Cited

U.S. PATENT DOCUMENTS

| | | | |
|---|---|---|---|
| 2015/0066284 A1* | 3/2015 | Yopp | B60W 30/00 |
| | | | 701/29.2 |
| 2017/0212525 A1* | 7/2017 | Wang | G01C 21/3492 |
| 2017/0313323 A1* | 11/2017 | Tseng | B60K 35/00 |
| 2017/0370740 A1* | 12/2017 | Nagy | G01C 21/3484 |
| 2018/0004211 A1* | 1/2018 | Grimm | G01C 21/3407 |
| 2018/0005254 A1* | 1/2018 | Bai | G06Q 30/0203 |
| 2018/0164808 A1* | 6/2018 | Prokhorov | B60W 50/08 |

FOREIGN PATENT DOCUMENTS

| | | |
|---|---|---|
| JP | 2017-78605 A | 4/2017 |
| JP | 2017-106736 A | 6/2017 |

\* cited by examiner

300

```
┌─────────────────────────────────────────────────────────────────────────────┐
│ An optimization system causes a Global Positioning System ("GPS system") of a Highly Autonomous │
│ Vehicle ("HAV") generates GPS data describing a start point for the HAV. In some embodiments, the GPS │
│ system and the GPS data are compliant with a Dedicated Short Range Communication ("DSRC") standard. │
│ For example, the GPS system describes the start point with an accuracy of plus or minus 1.5 meters │
│ relative to the actual start point of the HAV in the real-world. 305 │
└─────────────────────────────────────────────────────────────────────────────┘
                                        ↓
┌─────────────────────────────────────────────────────────────────────────────┐
│ A driver of the vehicle specifies a destination. A trip by the HAV between the start point and the destination │
│ are referred to herein as a "journey." 310 │
└─────────────────────────────────────────────────────────────────────────────┘
                                        ↓
┌─────────────────────────────────────────────────────────────────────────────┐
│ The optimization system causes a navigation system of the HAV to generate a set of candidate routes for │
│ traveling between the start point and the destination. Candidate route data is digital data that describes the │
│ set of candidate routes. The optimization system stores the candidate route data in the memory of the │
│ HAV. 315 │
└─────────────────────────────────────────────────────────────────────────────┘
                                        ↓
┌─────────────────────────────────────────────────────────────────────────────┐
│ The communication unit of the HAV receives external data from the network for each of the candidate │
│ routes included in the set of candidate routes. The optimization system stores the external data in the │
│ memory of the HAV. The external data is digital data that describes, for each candidate route, one or more │
│ of the following: (1) the autonomous features which may be triggered by the sensor data that the HAV will │
│ record while traveling on the candidate route [e.g., based on which ADAS functionality have been triggered │
│ by other vehicles while traveling portions of this candidate route as described in DSRC messages received │
│ from other vehicles]; (2) road information affecting when automated driving is safe or possible along a │
│ particular route; (3) weather conditions affecting when automated driving is safe or possible along a │
│ particular route; (4) road traffic conditions affecting when automated driving is safe or possible along a │
│ particular route; and (5) lighting conditions for the road environment which affect whether automated driving │
│ is safe or possible along a particular route or all routes. An autonomous feature is the functionality provided │
│ by one or more Advanced Driver Assistance Systems ("ADAS system" if singular, or "ADAS systems" if │
│ plural) of the HAV. 320 │
└─────────────────────────────────────────────────────────────────────────────┘
                                        ↓
┌─────────────────────────────────────────────────────────────────────────────┐
│ The optimization system causes the internal sensors of the HAV to record internal sensor data. The │
│ internal sensor data is digital data describing a condition of the driver. The optimization system analyzes │
│ the internal sensor data to determine the driver data. The driver data is digital data that describes: (1) the │
│ condition of the driver; and (2) how this condition affects whether the driver can contribute to controlling the │
│ operation of the HAV 123 (e.g., how much the driver can contribute to controlling the operation of the HAV │
│ 123 based on their condition). 325 │
└─────────────────────────────────────────────────────────────────────────────┘
                                        ↓
                                       (A)
```

| The optimization system causes an interface device of the HAV to depict a graphical user interface ("GUI") which is operable to receive inputs from the driver describing their preference for how often the HAV should utilize automated driving mode versus requiring the driver to operate the HAV without any automated driving mode being engaged and which types of autonomous features the driver prefers to be active. The optimization system receives the inputs from the GUI and stores preference data in the memory of the HAV. The preference data is digital data that describes the driver's preference for how often the HAV should utilize automated driving mode versus requiring the driver to operate the HAV without any automated driving mode being engaged, the particular autonomous features provided by the ADAS systems of the HAV and which autonomous features the driver prefers to be active. 330 |

| The optimization system analyses the driver data and the preference data to determine an optimal degree of automation for traveling between the start point and the destination based on the condition of the driver and the preferences of the driver. The optimal degree of automation is digital data that describes how much automated driving is optimal for traveling between the start point and the end point of the journey based on the condition of the driver and the preferences of the driver. In some embodiments, the optimal degree of automation is expressed as one or more of the following: a percentage (e.g., X % of a journey where "X" is a positive whole number); and an amount of time for the journey (e.g., X minutes where "X" is a positive whole number). The optimal degree of automation is stored by the optimization system in the memory of the HAV. 335 |

| The optimization system analyses one or more of the following types of digital data to determine a possible degree of automation for the candidate routes included in the set of candidate routes based on one or more of the following: the candidate route data; the external data; the driver data; and the preference data. A possible degree of automation is digital data that describes, for a particular candidate route, how much automated driving is possible for traveling between the start point and the destination based on the external data for that particular candidate route, the condition of the driver as described by the driver data and the preferences of the driver as described by the preference data. In some embodiments, each candidate route from the set of candidate routes is assigned its own value for the possible degree of automation. In some embodiments, the possible degree of automation for each candidate route is expressed as a percentage (e.g., X % of a journey where "X" is a positive whole number) or an amount of time for the journey (e.g., X minutes where "X" is a positive whole number). 340 |

| The optimization system compares the value for the optimal degree of automation to the values for the possible degree of automation for each candidate route to determine which of the routes is a best available fit for the optimal degree of optimization. The best available fit is the candidate route having a value for the possible degree of automation which is closest to the value for the optimal degree of automation. If a tie is present, then the best available fit is the route which has the shortest duration or other factors which are desirable to the driver. 345 |

The optimization system selects the candidate route which is the best available fit as the current navigation route for the HAV. This route is now referred to as the "selected route." The optimization system provides the selected route to the automated driving system of the HAV and causes the automated driving system to operate the HAV so that the HAV travels on this selected route for the journey. In some embodiments, the optimization system may constantly re-evaluate the set of candidate routes based on newly available analysis data and may select a new route from this set if the new analysis data warrants a change. 350

Figure 3C

DSRC Data 605
(an element of the External Data 191)

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) Location Data Describing the Location of the Vehicle, where the Location Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle (e.g., path history data).

Figure 6A

DSRC Data 605
(an element of the External Data 191)

Part 1

Vehicle Position Data (local three-dimensional "local 3D")
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate)
- Brake system status
- The status for the Advanced Driver Assistance Systems ("ADAS system" or "ADAS systems") of the vehicle Vehicle Size Data

Part 2

Vehicle Path History Data
Future Vehicle Path Estimation
Hard Active Braking
ADAS Activation Data: Descriptions of which ADAS systems have been activated, times when they were activated and how long they have been activated. For example:
- Traction Control System active over 100 milliseconds?
- Antilock Brake System active over 100 milliseconds?
- Automatic Cruise Control System active over 100 milliseconds?
- Lane Keep Assist System active over 100 milliseconds?

Light Status
Wiper Status
Vehicle type

Figure 6B

OPTIMIZING A ROUTE SELECTION FOR A HIGHLY AUTONOMOUS VEHICLE

BACKGROUND

The specification relates to optimizing a route selection for a highly autonomous vehicle ("HAV" if singular, "HAVs" if plural). In some embodiments, the route selection is optimized based on the functionality provided by one or more Advanced Driver Assistance Systems ("ADAS system" if singular, "ADAS systems" if plural) of the HAV.

Vehicle control systems are becoming increasingly popular. One example of a vehicle control system is an ADAS system.

ADAS systems provide one or more autonomous features to the vehicles which include these ADAS systems. For example, an ADAS system may monitor the position of a vehicle relative to the lane in which the vehicle is traveling, and if the vehicle begins to swerve outside of that lane the ADAS system may take remedial action by repositioning the vehicle so that the vehicle stays in the lane or providing a notification to a driver of the vehicle so that the driver knows that they need to take action to remedy the situation.

Some vehicles include a sufficient number and quality of autonomous features that they are considered to be autonomous vehicles.

There are two categories of situations which limit the use of autonomous features for a vehicle. First, autonomous vehicles cannot handle all traffic situations without their drivers intervening to assist them. Second, there are also some traffic situations that have qualities such that drivers do not trust their autonomous vehicles to handle these traffic situations. Both of these are categories of traffic situations which require that drivers provide their attention to the roadway and intervene in the operation of their autonomous vehicles using their knowledge of the current traffic situation.

SUMMARY

The National Highway Traffic Safety Administration ("NHTSA") has defined different "levels" of autonomous vehicles, e.g., Level 0, Level 1, Level 2, Level 3, Level 4 and Level 5. If a vehicle has a higher-level number than another vehicle (e.g., Level 3 is a higher-level number than Levels 2 or 1), then the vehicle with a higher-level number offers a greater combination and quantity of autonomous features relative to the vehicle with the lower level number. The different levels of autonomous vehicles are described briefly below.

Level 0: The set of ADAS systems installed in the vehicle have no vehicle control, but may issue warnings to the driver of the vehicle.

Level 1: The driver must be ready to take control at any time. The set of ADAS systems installed in the vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the vehicle fail to respond properly (based on the driver's subjective judgement). The set of ADAS systems installed in the vehicle executes accelerating, braking, and steering. The set of ADAS systems installed in the vehicle can deactivate immediately upon takeover by the driver.

Level 3: Within known, limited environments (such as freeways), the driver can safely turn their attention away from driving tasks, but must still be prepared to take control of the vehicle when needed.

Level 4: The set of ADAS systems installed in the vehicle can control the vehicle in all but a few environments such as severe weather. The driver must enable the automated system (which is comprised of the set of ADAS systems installed in the vehicle) only when it is safe to do so. When the automated system is enabled, driver attention is not required for the vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

An HAV is a vehicle that includes a set of ADAS systems that operate at Level 3 or higher as defined by the NHTSA on page 9 of their policy paper entitled "Federal Automated Vehicles Policy: Accelerating the Next Revolution in Roadway Safety," which was published in September of 2016. The set of ADAS systems is referred to herein as an "ADAS system set." See, e.g., the ADAS system set 180 depicted in FIG. 1A.

Described herein are embodiments of an optimization system that is an element of an HAV. The automated features provided by the ADAS system set of the HAV may be collectively referred to as an "automated driving service."

The HAV includes a navigation system. The HAV is located at a start point of a journey. The driver of the HAV inputs a destination for the journey. The journey is a trip that begins at the start point and ends at the destination. The navigation outputs a set of candidate routes for the HAV to travel from the start point to the end point.

In some embodiments, it is not possible for the HAV to provide the automated driving service along 100% of each of the candidate routes included in the set of candidate routes. In other words, some of the candidate routes may require the driver to manage some or all of the responsibility for driving the HAV for select portions of the route (or possibly for 100% of the route). For example, FIG. 1B depicts a set of candidate routes in which some of the candidate routes include portions for which the automated driving service is not available according to some embodiments.

There are various reasons why the automated driving service will not be available for portions of a candidate route. For example, select portions of a particular candidate route may include a combination of weather and road conditions (or other external factors) which make it unsafe for the HAV to provide the automated driving service for one or more select portions of the particular candidate route such that the driver would need to take control of some aspects of the driving of the HAV for these select portions of the route. These external factors are described by external data. The external data is described in more detail below. These external factors provide a limitation on which candidate route is selected by the optimization system when optimizing the selection of a candidate route from the set of candidate routes.

Another limitation of which candidate route is selected by the optimization system are the condition of the driver and the preferences of the driver. For example, in some situations the driver may not be available to take over aspects of the driving of the HAV due to factors such as fatigue, impairment, sickness, illness and the physical or mental well-being of the driver. The driver may also have preferences for how frequently they wish to receive the automated driving service from the HAV or which particular autonomous features they wish to receive from particular ADAS systems of the HAV. The factors which describe the fatigue, impairment, sickness, illness and the physical or mental well-being of the driver are described by driver data. The factors which describe the preferences of the driver are described by preference data. The driver data and the preference data are described in more detail below.

In some embodiments, the optimization system aggregates external data for each of the candidate routes outputted by the navigation system of the HAV. The external data is digital data that describes one or more external factors for a candidate route which limit the availability of the automated driving service of an HAV that travels along the candidate route. The following are examples of external factors which are described by the external data: the types of roadways included in the candidate route (whether the roadway is a lower-capacity roadway; whether the roadway is a higher capacity roadway); the geographic location of the different roadways included in the candidate route (whether the roadway is located in a rural area, whether the roadway is located in an urban area, whether the roadway is flat, whether the roadways is elevated); the driving speeds of the different roadways included in the candidate route; the lighting conditions of the roadways included in the candidate route; the weather conditions that will be experienced while driving on the candidate route; and which ADAS systems are likely to be engaged while driving on the candidate route.

In some embodiments, external data is received from one or more electronic services which provide digital data to the optimization system that describes one or more of the external factors. For example, an external factors server may provide digital data that describes the weather that will be experienced while traveling on a particular candidate route, whether the particular candidate route travels through rural or urban areas, the average driving speeds along the particular candidate route, variations in elevation along the particular candidate route, the types of roadways included in the particular candidate route, etc.

In some embodiments, the HAV is a Dedicated Short Range Communication-equipped vehicle ("DSRC-equipped vehicle" if singular, "DSRC-equipped vehicles" if plural). A DSRC-equipped vehicle is a vehicle which includes a DSRC radio and a DSRC-compliant GPS unit. DSRC-equipped vehicles broadcast a Basic Safety Message ("BSM message") at regular intervals (e.g., once every 0.1 seconds or some other interval which is user configurable). Each BSM message includes DSRC data that describes the vehicle which broadcasted the BSM message, the path of travel of the vehicle (including its historical path), the speed of the vehicle while traveling on the path, which ADAS systems where engaged while traveling on the path, etc.

In some embodiments, the HAV is traveling on a roadway which includes other DSRC-equipped vehicles, and these DSRC-equipped vehicles broadcast BSM messages and other DSRC messages which include DSRC data. The optimization system of the HAV retrieves these BSM and DSRC messages and extracts the DSRC data that they contain. This DSRC data is another potential source of external data as described above. The DSRC data is depicted in FIGS. 6A and 6B according to some embodiments.

In some embodiments, external data is transmitted to the HAV by one or more other vehicles and roadside units via a wireless message that is transmitted by a cellular network or via millimeter wave communication. For example, the wireless message may include digital data that describes information similar to the information that is described by the digital data.

In some embodiments, the HAV includes one or more internal sensors which monitor the condition of the driver and record internal sensor data that describes the measurements of the internal sensors. The optimization system then analyzes the internal sensor data to determine driver data. The driver data is digital data that describes the condition of the driver and how much they can contribute to the operation of the HAV based on their condition. The driver data is stored in a non-transitory memory of the HAV. For example, the HAV includes an Electronic Control Unit ("ECU") or some other Onboard Unit ("OBU") such as an onboard vehicle computer system, and this OBU includes the non-transitory memory that stores the external data. In some embodiments, each instance of external data is stored in the non-transitory memory so that it is assigned to, or digitally associated with, the candidate route that it describes (e.g., the external factors described by the external data describe a portion of a candidate route, and the external data is digitally associated with the candidate route which is described by the external factors). The driver data is digital data that describes the condition of the driver and how much they can contribute to the operation of the HAV based on their condition.

In some embodiments, the condition of the driver described by the driver data limits the driver's availability for taking over control of some or all aspects of operating the HAV (e.g., steering the HAV, managing the acceleration of the HAV, managing a braking system of the HAV, etc.). For example, if the driver data indicates that the driver is sleepy or impaired, then this condition of the driver is a limitation on whether the optimization system can select a candidate route which requires the driver to operate the HAV without any automated driving service being provided to the driver by the HAV.

In some embodiments, the HAV includes an interface device such as an electronic display, heads-up display unit or three-dimensional heads-up unit ("3D-HUD"). The driver of the vehicle provides inputs to a graphical user interface ("GUI") displayed by the interface device which defines their preferences, and these preferences are digitally stored as the preferences data in the non-transitory memory of the HAV. The 3D-HUD is depicted in FIG. 5 according to some embodiments.

For example, the driver may prefer to receive the automated driving service as much as possible. In another example, the user prefers to receive some autonomous features provided by some ADAS systems of the HAV but not autonomous features. For example, the driver may prefer to receive the autonomous features of the ACC of the HAV, but not the LKA. The non-transitory memory of the HAV stores the preference data. The preference data is digital data that describes the preference of the driver for how frequently they wish to receive the automated driving service from the HAV or which particular autonomous features they wish to receive from particular ADAS systems of the HAV, and optionally, how frequently they wish to receive these particular autonomous features.

In some embodiments, the optimization system considers one or more of the following when selecting which candidate route to select for a journey: the candidate route data; the external data; the driver data; and the preference data. In some embodiments, the optimization system is operable to optimize a selection of a route from among a set of candidate routes so that the route selected by the optimization system (1) provides an amount of automated driving service which matches (or substantially matches) the driver's availability for taking over control of some or all aspects of operating or driving the HAV and (2) corresponds to the driver's preference for taking over control of some or all aspects of operating or driving the HAV. An example process flow in which the optimization system considers one or more of the candidate route data, the external data, the driver data and the preference data is depicted in FIG. 4 according to some embodiments.

In some embodiments, the non-transitory memory of the HAV stores analysis data. The analysis data is digital data that describes both (1) the external factors affecting the availability of autonomous features along different candidate routes and (2) the preferences of the driver for receiving the autonomous driving service from the HAV.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method implemented by an HAV which provides an automated driving service to a driver of the HAV, the method including: generating a set of candidate routes for a journey; aggregating external data digitally describing one or more external factors which limit an availability of the automated driving service while traveling along the candidate routes included in the set of candidate routes, where each candidate route in the set of candidate routes has its own external data; determining a first value for an optimal degree of automation for traveling, by the driver, the journey; determining a plurality of second values each indicating a possible degree of automation for each candidate route included in the set of candidate routes based on the external data; and selecting, by an onboard unit of the HAV, an optimum route from the set of candidate routes according to the first value and the plurality of second values. Other embodiments of this aspect include corresponding computer systems, apparatus, and computer programs recorded on one or more computer storage devices, each configured to perform the actions of the methods.

Implementations may include one or more of the following features. The method where the first value is determined based on a condition of the driver and one or more preferences of the driver. The method where one or more steps of the method are executed by an onboard vehicle computer of the HAV. The method where the external data is received via a DSRC message transmitted on a 5.9 gigahertz (GHz) band. The method where the condition of the driver includes a condition which limits an availability of the driver for taking over control of some or all aspects of operating the HAV. The method where operating the HAV includes steering the HAV. The method where operating the HAV includes managing an acceleration of the HAV. The method where the operating the HAV includes managing a braking system of the HAV. The method where the one or more preferences of the driver include the driver's preference for how frequently they want to receive the automated driving service from the HAV or which particular autonomous features they wish to receive from particular advanced driver assistance systems of the HAV. The method where each candidate route is assigned its own external data. Implementations of the described techniques may include hardware, a method or process, or computer software on a computer-accessible medium.

One general aspect includes a system of an HAV which provides an automated driving service to a driver of the HAV, the system including: an onboard vehicle computer system including a non-transitory memory storing computer code which, when executed by the onboard vehicle computer system causes the onboard vehicle computer system to: generate a set of candidate routes for a journey; aggregate external data digitally describing one or more external factors which limit an availability of the automated driving service while traveling along the candidate routes included in the set of candidate routes, where each candidate route in the set of candidate routes has its own external data; determine a first value for an optimal degree of automation for traveling, by the driver, the journey; determine a plurality of second values each indicating a possible degree of automation for each candidate route included in the set of candidate routes based on the external data; and select an optimum route from the set of candidate routes according to the first value and the plurality of second values. Other embodiments of this aspect include corresponding computer systems, apparatus, and computer programs recorded on one or more computer storage devices, each configured to perform the actions of the methods.

Implementations may include one or more of the following features. The system where the first value is determined based on a condition of the driver and one or more preferences of the driver. The system where the external data is received via a DSRC message transmitted on a 5.9 GHz band. The system where the condition of the driver includes a condition which limits an availability of the driver for taking over control of some or all aspects of operating the HAV. The system where operating the HAV includes steering the HAV. The system where operating the HAV includes managing an acceleration of the HAV. The system where the operating the HAV includes managing a braking system of the HAV. The system where the one or more preferences of the driver include the driver's preference for how frequently they want to receive the automated driving service from the HAV or which particular autonomous features they wish to receive from particular advanced driver assistance systems of the HAV. The system where each candidate route is assigned its own external data. Implementations of the described techniques may include hardware, a method or process, or computer software on a computer-accessible medium.

One general aspect includes a computer program product including a non-transitory memory of an onboard vehicle computer system of an HAV which provides an automated driving service to a driver of the HAV, the computer system storing computer-executable code that, when executed by the onboard vehicle computer system, causes the onboard vehicle computer system to: generate a set of candidate routes for a journey; aggregate external data digitally describing one or more external factors which limit an availability of the automated driving service while traveling along the candidate routes included in the set of candidate routes, where each candidate route in the set of candidate routes has its own external data; determine a first value for an optimal degree of automation for traveling, by the driver, the journey; determine a plurality of second values each indicating a possible degree of automation for each candidate route included in the set of candidate routes based on the external data; and select an optimum route from the set of candidate routes according to first value and plurality of second values. Other embodiments of this aspect include corresponding computer systems, apparatus, and computer programs recorded on one or more computer storage devices, each configured to perform the actions of the methods.

Implementations may include one or more of the following features. The computer program product where the first value is determined based on a condition of the driver and one or more preferences of the driver. The computer program product where the external data is received via a DSRC message transmitted on a 5.9 GHz band. The computer program product where the condition of the driver includes a condition which limits an availability of the driver for taking over control of some or all aspects of operating the HAV. The computer program product where operating the HAV includes steering the HAV. The computer program product where operating the HAV includes managing a speed of the HAV. The computer program product where the one or more preferences of the driver include the driver's preference for how frequently they want to receive the automated driving service from the HAV or which particular autonomous features they wish to receive from particular advanced driver assistance systems of the HAV. The computer program product where each candidate route is assigned its own external data. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 3A-3C are an example flow diagram of a method for optimizing a selection of a candidate route from among the set of candidate routes according to some embodiments.

FIGS. 6A and 6B are block diagrams of DSRC data according to some embodiments.

DETAILED DESCRIPTION

Figure 1A:
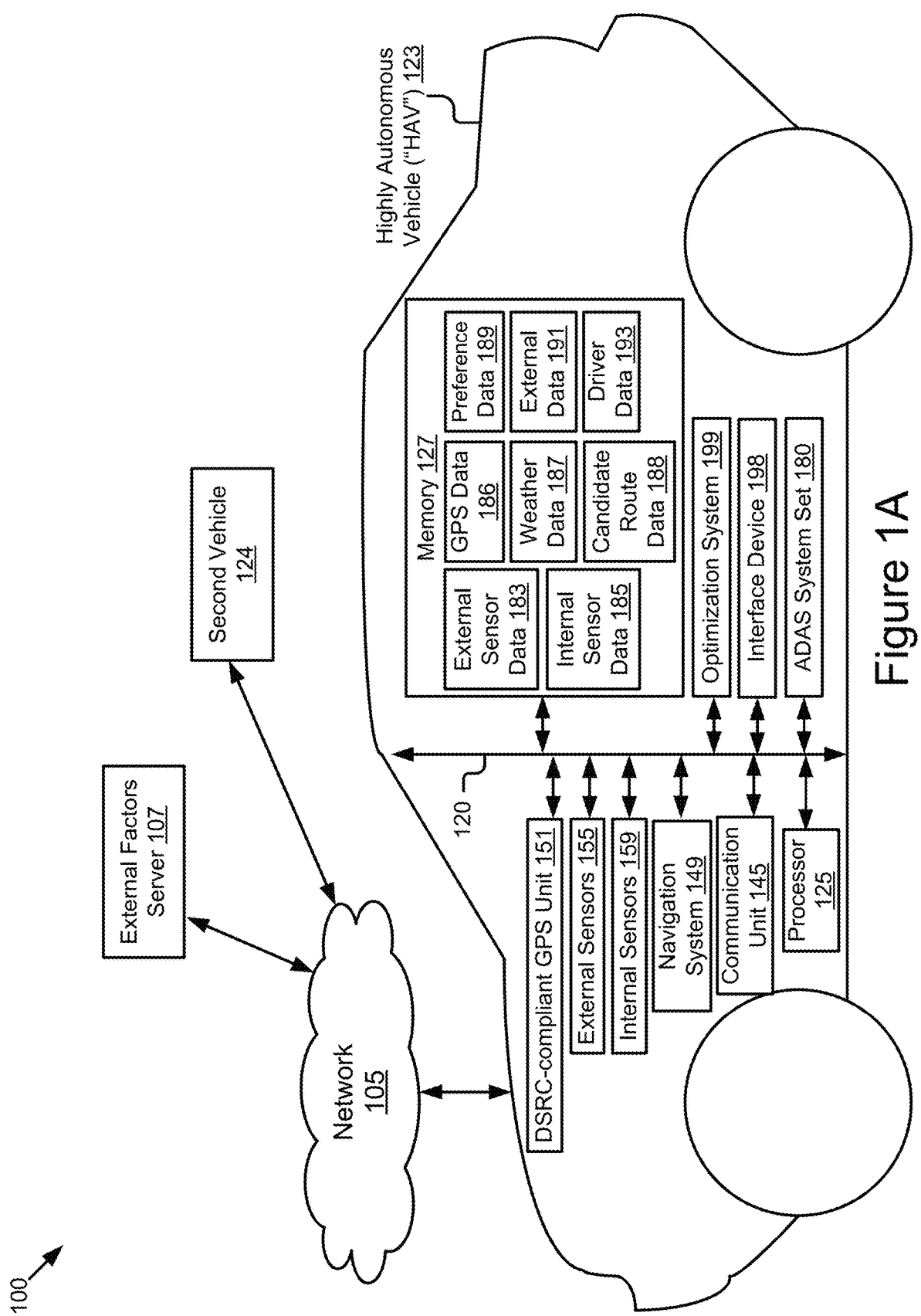
FIG. 1A is a block diagram illustrating an operating environment for an optimization system of a HAV according to some embodiments.

Described herein are embodiments of the optimization system. The optimization system is an element of an autonomous vehicle. In some embodiments, the optimization system is an element of an HAV. For example, an autonomous vehicle including the optimization system includes a set of ADAS systems which provide the autonomous vehicle with autonomous features which are Level 3 or higher as defined by the NHTSA.

In some embodiments, the optimization system includes code and routines that are operable, when executed by a processor of the HAV, to cause a DSRC-compliant GPS system of the HAV to retrieve or generate GPS data describing a start point for the HAV. In some embodiments, the GPS system and the GPS data are compliant with a DSRC standard. For example, the GPS system describes the start point with an accuracy of plus or minus 1.5 meters relative to the actual start point of the HAV in the real-world.

In some embodiments, a driver of the vehicle specifies a destination. A trip by the HAV between the start point and the destination are referred to herein as a "journey."

In some embodiments, optimization system includes code and routines that are operable, when executed by a processor of the HAV, to cause a navigation system of the HAV to generate a set of candidate routes for traveling between the start point and the destination. Candidate route data is digital data that describes the set of candidate routes. The optimization system stores the candidate route data in the memory of the HAV.

In some embodiments, the communication unit of the HAV receives external data from the network for each of the candidate routes included in the set of candidate routes. The optimization system includes code and routines that are operable, when executed by a processor of the HAV, to cause the processor to store the external data in the memory of the HAV. The external data is digital data that describes, for each candidate route, one or more of the following: (1) the autonomous features which may be triggered by the sensor data that the HAV will record while traveling on the candidate route [e.g., based on which ADAS functionality have been triggered by other vehicles while traveling portions of this candidate route as described in DSRC messages received from other vehicles]; (2) road information affecting when automated driving is safe or possible along a particular route; (3) weather conditions affecting when automated driving is safe or possible along a particular route; (4) road traffic conditions affecting when automated driving is safe or possible along a particular route; and (5) lighting conditions for the road environment which affect whether automated driving is safe or possible along a particular route or all routes. An autonomous feature is the functionality provided by one or more ADAS systems of the HAV.

In some embodiments, the optimization system includes code and routines that are operable, when executed by a processor of the HAV, to cause the internal sensors of the HAV to record internal sensor data. The internal sensor data is digital data describing a condition of the driver. The optimization system analyzes the internal sensor data to determine the driver data. The driver data is digital data that describes (1) the condition of the driver and (2) how this condition affects whether the driver can contribute to controlling the operation of the HAV 123 (e.g., how much the driver can contribute to controlling the operation of the HAV 123 based on their condition). For example, the memory of the HAV includes a data set that describes different conditions of the driver and how much the driver can contribute to controlling the operation of the HAV 123 if they are experiencing these conditions.

In some embodiments, the condition of the driver described by the driver data limits the driver's availability for taking over control of some or all aspects of operating the HAV (e.g., steering the HAV, managing the acceleration of the HAV, managing a braking system of the HAV, etc.).

In some embodiments, the optimization system includes code and routines that are operable, when executed by a processor of the HAV, to cause an interface device of the HAV to depict a GUI which is operable to receive inputs from the driver describing their preference for how often the HAV should utilize automated driving mode versus requiring the driver to operate the HAV without any automated driving mode being engaged and which types of autonomous features the driver prefers to be active. The optimization system receives the inputs from the GUI and stores preference data in the memory of the HAV. The preference data is digital data that describes the driver's preference for how often the HAV should utilize automated driving mode versus requiring the driver to operate the HAV without any automated driving mode being engaged, the particular autonomous features provided by the ADAS systems of the HAV and which autonomous features the driver prefers to be active.

In some embodiments, the optimization system includes code and routines that are operable, when executed by a processor of the HAV, to cause the processor to analyze the driver data and the preference data to determine an optimal degree of automation for traveling between the start point and the destination based on the condition of the driver and the preferences of the driver. The optimal degree of automation is digital data that describes how much automated driving is optimal for traveling between the start point and the end point of the journey based on the condition of the driver and the preferences of the driver. In some embodiments, the optimal degree of automation is expressed as one or more of the following: a percentage (e.g., X % of a journey where "X" is a positive whole number); and an amount of time for the journey (e.g., X minutes where "X" is a positive whole number). The optimal degree of automation is stored by the optimization system in the memory of the HAV.

In some embodiments, the optimization system includes code and routines that are operable, when executed by a processor of the HAV, to cause the processor to analyze one or more of the following types of digital data to determine a possible degree of automation for the candidate routes included in the set of candidate routes based on one or more of the following: the candidate route data; the external data; the driver data; and the preference data. A possible degree of automation is digital data that describes, for a particular candidate route, how much automated driving is possible for traveling between the start point and the destination based on the external data for that particular candidate route, the condition of the driver as described by the driver data and the preferences of the driver as described by the preference data. In some embodiments, each candidate route from the set of candidate routes is assigned its own value for the possible degree of automation. In some embodiments, the possible degree of automation for each candidate route is expressed as a percentage (e.g., X % of a journey where "X" is a positive whole number) or an amount of time for the journey (e.g., X minutes where "X" is a positive whole number). See, for example, FIG. 4.

In some embodiments, the optimization system includes code and routines that are operable, when executed by a processor of the HAV, to cause the processor to compare the value for the optimal degree of automation to the values for the possible degree of automation for each candidate route to determine which of the routes is a best available fit for the optimal degree of optimization. The best available fit is the candidate route having a value for the possible degree of automation which is closest to the value for the optimal degree of automation. If a tie is present, then the best available fit is the route which has the shortest duration or other factors which are desirable to the driver.

In some embodiments, the optimization system includes code and routines that are operable, when executed by a processor of the HAV, to cause the processor to select the candidate route which is the best available fit as the current navigation route for the HAV. This route is now referred to as the "selected route." The optimization system provides the selected route to the automated driving system of the HAV and causes the automated driving system to operate the HAV so that the HAV travels on this selected route for the journey.

The optimization system is now described with reference to FIG. 1A.

Referring to FIG. 1A, depicted is an operating environment 100 for an optimization system 199 of a HAV 123 according to some embodiments.

The operating environment 100 may include one or more of the HAV 123, an external factors server 107 and a second vehicle 124. These elements may be communicatively coupled to one another via a network 105. Although one HAV 123, one external factors server 107, one second vehicle 124 and one network 105 are depicted in FIG. 1A, in practice the operating environment 100 may include one or more HAVs 123, one or more external factors servers 107, one or more second vehicles 124 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, dedicated short range communication ("DSRC"), full-duplex wireless communication, etc. The network 105 may also include a mobile data network that may include 3G, 4G, 5G, Long-Term Evolution ("LTE"), Long-Term Evolution-Vehicle-to-X ("LTE-V2X"), Long-Term Evolution Vehicle-to-Vehicle ("LTE-V2V"), VoLTE or any other mobile data network or combination of mobile data networks. Further, the network 105 may include one or more IEEE 802.11 wireless networks.

In some embodiments, the HAV 123 is a DSRC-equipped autonomous vehicle. The second vehicle 124 is a DSRC-equipped vehicle. The network 105 may include one or more communication channels shared among the HAV 123 and the second vehicle 124. The communication channel may include DSRC, LTE vehicle to everything (V2X), full-duplex wireless communication or any other wireless communication protocol. For example, the network 105 may be used to transmit a DSRC message, a DSRC probe, a basic safety message (BSM) or a full-duplex message including any of the data described herein.

The HAV 123 is any type of autonomous vehicle having an ADAS system set 180 operating at Level 3 or greater. For example, the HAV 123 is one of the following types of HAV 123: a car; a truck; a sports utility vehicle; a bus; a semi-truck; a drone or any other roadway-based conveyance.

In some embodiments, the HAV 123 includes one or more of the following elements: a processor 125; a memory 127;

a communication unit 145; a DSRC-compliant GPS unit 151; a navigation system 149; external sensors 155; internal sensors 159; the ADAS system set 180; an interface device 198; and an optimization system 199. These elements of the HAV 123 are communicatively coupled to one another via a bus 120.

HAV 123

In some embodiments, the processor 125 and the memory 127 are elements of an onboard vehicle computer system (such as computer system 200 described below with reference to FIG. 2), or some other OBU of the HAV 123.

In some embodiments, the onboard vehicle computer system is operable to cause or control the operation of the optimization system 199. The onboard vehicle computer system is operable to access and execute the data stored on the memory 127 to provide the functionality described herein for the optimization system 199 or its elements (see, e.g., FIG. 2). The onboard vehicle computer system is operable execute the optimization system 199 which causes the onboard vehicle computer system to execute one or more of the steps of the method 300 described below with reference to FIGS. 3A-3C.

In some embodiments, the DSRC-compliant GPS unit 151 is operable to retrieve GPS data 186 that describes one or more locations of the HAV 123 at one or more different times. The GPS data 186 may be timestamped to indicate the time when the HAV 123 was at this particular location. In some embodiments, the particular location described by the GPS data 186 is the start point for a journey. For example, with reference to FIG. 1B, the particular location described by the GPS data 186 is a start point 131 for a journey that begins at the start point 131 and ends at a destination 132.

Referring back to FIG. 1A. In some embodiments, the DSRC-compliant GPS unit 151 includes any hardware or software necessary to make the HAV 123 or the DSRC-compliant GPS unit 151 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 151 is operable to provide GPS data 186 describing the location of the HAV 123 with lane-level accuracy. For example, the HAV 123 is traveling on a roadway of a roadway environment. Lane-level accuracy means that the location of the HAV 123 is described so accurately that the HAV's 123 lane of travel may be accurately determined even if the HAV 123 is traveling on a roadway which includes a plurality of lanes each traveling in a same direction or heading as the HAV 123 and its lane of travel. In the context of the optimization system 199, lane-level accuracy enables the optimization system 199 to more accurately determine external factors which may affect which autonomous features can be provided by the ADAS system set 180 or whether the autonomous driving service can be provided at all. For example, a particular lane of a roadway may be more adversely affected by external factors than other lanes of the same roadway (e.g.: a flooded lane of a roadway; a lane of a roadway more affected by ice than other neighboring lanes; a lane of a roadway affected by a traffic accident whereas other neighboring lanes are unaffected or less affected; a lane of a roadway which is affected by other local conditions which are not present for the other lanes of the same roadway; and etc.), and this information may affect which autonomous features can be provided by the ADAS system set 180 or whether the autonomous driving service can be provided at all by the ADAS system set 180. If the second vehicle 124 is also DSRC-enabled, then it will also include its own instance of the DSRC-compliant GPS unit 151, and in this way the DSRC data it provides to the optimization system 199 will also describe the external factors with lane-level accuracy. In this way, the GPS data 186 having lane-level accuracy beneficially renders the optimization system 199 operable to provide its functionality with a consideration of external factors on a lane-by-lane basis, thereby improving the ability of the optimization system 199 to select an optimum route from a set of candidate routes.

In some embodiments, the DSRC-compliant GPS unit 151 includes hardware that wirelessly communicates with a GPS satellite to retrieve GPS data 186 that describes a location of the HAV 123 with a precision that is compliant with the DSRC standard. The DSRC standard requires that GPS data 186 be precise enough to infer if two vehicles (one of which is, for example, the HAV 123) are in the same lane at the same time. The lane may be a lane of a roadway. In some embodiments, the DSRC-compliant GPS unit 151 is operable to identify, monitor and track its two-dimensional position within 1.5 meters of its actual position 68% of the time under an open sky. Since lanes of a roadway are typically no less than 3 meters wide, whenever the two-dimensional error of the GPS data 186 is less than 1.5 meters the optimization system 199 described herein may analyze the GPS data 186 provided by the DSRC-compliant GPS unit 151 and determine what lane of the roadway the HAV 123 is traveling in based on the relative positions of two or more different vehicles (one of which is, for example, the HAV 123) on the roadway at the same time.

By comparison to the DSRC-compliant GPS unit 151, a conventional GPS unit which is not compliant with the DSRC standard is unable to determine the location of a HAV 123 with lane-level accuracy. For example, a typical lane of a roadway is approximately 3 meters wide. However, a conventional GPS unit only has an accuracy of plus or minus 10 meters relative to the actual location of the HAV 123. As a result, such conventional GPS units are not sufficiently accurate for use by the optimization system 199 in some embodiments since they would render the optimization system 199 inoperable to provide its functionality with a consideration of external factors on a lane-by-lane basis.

The navigation system 149 is an independent onboard unit of the HAV 123, or an element of the DSRC-compliant GPS unit 151, which is operable to receive GPS data 186 defining a start point for a journey and a user input from the driver of the HAV 123 which specifies a destination for the journey, and then output a set of candidate routes for the journey. The candidate route data 188 is digital data that describes the set of candidate routes. The set of candidate routes includes a plurality of candidate routes which each begin at the start point of the journey and end at the destination of the journey. The navigation system 149 is communicatively coupled to the interface device 198 and operable to cause the interface device 198 to display a GUI which the driver of the HAV 123 can use to provide the user input which specifies the destination for the journey.

In some embodiments, the navigation system 149 includes code and routines that are operable, when executed by the processor 125, to receive the user input from the interface device 198 as a first input that specifies the destination for a journey. The navigation system 149 is also operable to receive the GPS data 186 describing a current location of the HAV 123 as second input that specifies a start point for the journey. The navigation system 149 analyzes these inputs and determines a set of candidate routes which, if traveled by the HAV 123, will lead the HAV 123 from the start point specified by the second input to the destination specified by the first input, and thereby complete the journey specified by the combination of the first input and the second input.

In some embodiments, the navigation system 149 stores a set of map data on a local non-transitory memory of the HAV 123 (e.g., the memory 127) which describes the roadway of one or more geographic areas, and the navigation system 149 uses this set of map data in order to generate the set of candidate routes. In some embodiments, the navigation system 149 wirelessly communicates with a remote entity (e.g., a GPS satellite or a server) in order to access the set of map data which is stored by a remote non-transitory memory which is an element of this remote entity.

The external sensors 155 include one or more sensors that are operable to measure the physical environment outside of the HAV 123. For example, the external sensors 155 may record one or more physical characteristics of the physical environment that is proximate to the HAV 123. The sensors of the external sensors 155 may generate external sensor data 183. The external sensor data 183 may describe the recordings measured by the external sensors 155. For example, the external sensors 155 may store images captured by the external sensors 155, such as images captured by cameras, as external sensor data 183 in the memory 127.

In some embodiments, the external sensors 155 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The external sensor data 183 is digital data that describes measurements which are recorded by one or more of these external sensors 155.

The internal sensors 159 are sensors that monitor and measure the condition of the driver. For example, the internal sensors 159 include one or more of the following onboard sensors, or any similar onboard unit or derivative thereof: (1) one or more internal cameras which measure the eye gaze of the driver as an indicating that the driver is sleepy, drowsy or presently sleeping; (2) one or more internal cameras which measuring the eye closure of the driver as an indication that the driver is sleepy, drowsy or presently sleeping; (3) an eye monitoring system which measures the upper and lower eyelids of the driver, and calculates how open the eyes of the driver are over time; (4) a drowsiness detection system which identifies whether the driver of the HAV 123 is drowsy, falling asleep or presently asleep by (a) measuring sway patterns present in the steering of the HAV 123 over time when the steering is controlled by the driver and (b) comparing these measured patterns to known patterns of characteristic steering behavior by a drowsy person or sleeping person; (5) a driver status monitoring system manufactured and produced by DENSO of Kariya, Aichi Prefecture, Japan, which includes a camera directed at the driver and two or more near infrared light emitting diodes which work together to detect and measure (a) the driver's face angle, (b) long-duration eye closure, (c) drowsiness level and (d) head position by using image recognition and processing technologies; the driver status monitoring system uses these inputs to determine whether the driver is distracted or drowsy; and (6) a driver concentration system as manufactured and produced by Omron Corporation of Kyoto, Japan which include one or more internal cameras which capture images of the driver's motion and localized facial expressions (e.g., eyes not directed at road, driver has a facial expression of panic or emergency, driver is reading a book or some other written words, driver is using their smartphone or some other electronic device) and then analyzes the images based on a hierarchy which defines the amount of concentration the driver is providing to the task of driving the HAV 123 to determine whether the driver is providing sufficient concentration to the task of driving the HAV 123.

Another example of an onboard system that is included in the internal sensors 159 is the apparatus described in U.S. Patent Publication 2016/0262682 filed on Oct. 9, 2014 and entitled "Driver Monitoring Apparatus," the entirety of which is hereby incorporated by reference.

In some embodiments, the internal sensors 159 include one or more cameras, range finders, or other sensors which are operable to identify and track the head position of the driver.

In some embodiments, the internal sensors 159 include one or more internal vehicle cameras which monitor the driver. These images may be compared by the optimization system to one or more object priors stored on a memory 127 of the HAV 123; these object priors are associated with a set of known conditions such that comparison of the images to the object priors indicates whether the driver is currently exhibiting the conditions described by the individual object priors.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The HAV 123 may include one or more processors 125. Other processors, operating systems, sensors, displays, and physical configurations may be possible. In some embodiments, the one or more processors 125 are an element of an onboard vehicle computer or electronic control unit (ECU) of the HAV 123.

The memory 127 is a non-transitory storage medium that stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The HAV 123 may include one or more memories 127.

The memory 127 of the HAV 123 may store one or more of the following types of digital data: external sensor data 183; internal sensor data 185; GPS data 186; weather data 187; candidate route data 188; preference data 189; external data 191; and driver data 193. These elements of the memory 127 are described below.

The external sensor data 183 is digital data that describes the measurements recorded by the external sensors 155 of the HAV 123. In some embodiments, the external sensor data 183 is an element of the external data 191.

The internal sensor data 185 is digital data that describes the measurements recorded by the internal sensors 159 of the HAV 123. In some embodiments, the internal sensor data 185 is an input the optimization system 199 which is used by the optimization system 199 to determine the driver data 193.

The GPS data 186 is digital data that describes the geographic location of the HAV 123. In some embodiments, the GPS data 186 is received from the DSRC-compliant GPS unit 151 and describe the current location of the HAV 123 with such precision that the location of the HAV 123 within a particular lane is identified by the GPS data 186.

The weather data 187 is digital data that describes the weather present at the geographical location of the HAV 123. For example, the communication unit 145 queries the external factors server 107 via the network 105 for weather data 187 that describes the weather present at the geographical location of the HAV 123. The query includes the most recent or current GPS data 186 for the HAV 123. The external factors server 107 returns weather data 187 associated with the geographical location described by the GPS data 186. For example, the external factors server 107 includes a data structure that includes a list of geographic locations (described, for example, by latitude and longitude) and the weather conditions for these geographic locations. The external factors server 107 receives the GPS data 186 and retrieves the weather data 187 associated with the geographic location described by the GPS data 186. The external factors server 107 then transmits the weather data 187 to the communication unit 145 via the network 105. The communication unit 145 then stores the weather data 187 in the memory 127. This process may be repeated for each new instance of GPS data 186 or at some other interval.

In some embodiments, the weather data 187 is an element of the external data 191.

The candidate route data 188 is digital data that describes the set of candidate routes outputted by the navigation system 149.

The preference data 189 is digital data that describes the preference of the driver for one or more of the following: (1) how frequently the driver wants to receive the automated driving service from the HAV 123 (or the ADAS system set 180 of the HAV 123); (2) which particular autonomous features the driver wants to receive from particular ADAS systems of the ADAS system set 180; and (3) how frequently the driver wants to receive particular autonomous features from the particular ADAS systems of the ADAS system set 180.

In some embodiments, the driver inputs the preference data 189 using the interface device 198. In some embodiments, the driver inputs the preference data 189 using a smartphone or some other processor-based computing device which is operable to provide these inputs directly or indirectly to the optimization system 199 which stores the preference data 189 in the memory 127. For example, the driver provides the preference data 189 using a browser interface accessible using any browser or a smartphone application. In some embodiments, the driver inputs the preference data 189 using an electronic display which is an element of a head-unit of the HAV 123. This electronic display is an example of the interface device 198 according to some embodiments.

In some embodiments, the memory 127 stores graphical data. The graphical data is digital data that describes a GUI which is used by the driver to provide the preference data 189 to the optimization system 199 using the interface device 198.

The external data 191 is digital data that describes, for each of the candidate routes included in the set of candidate routes described by the candidate route data 188, one or more external factors for a particular candidate route which limit the availability of the automated driving service of an HAV that travels along the particular candidate route.

In some embodiments, the following are examples of external factors which are described by the external data 191 for each candidate route: (1) the types of roadways included in the particular candidate route (whether the roadway is a lower-capacity roadway such as a feeder road or a collector road; (2) whether the roadway is a higher capacity roadway such as an expressway, the dimensions of the roadway, the angles of curvature present in the roadway, the number of lanes includes in the roadway, etc.); (3) the geographic location of the different roadways included in the particular candidate route (whether the roadway is located in a rural area, whether the roadway is located in an urban area, whether the roadway is flat, whether the roadways is elevated, whether the roadway is curved and how many curves are present); (4) the driving speeds of the different roadways included in the particular candidate route; (5) the lighting conditions of the roadways included in the particular candidate route (e.g., factors that affect the current illumination of the roadway such as time or day and overcast weather); (6) the weather conditions that will be experienced while traveling along the particular candidate route (current weather conditions affecting when automated driving is safe or possible along a particular route; for example, autonomous features are generally less safe in icy, foggy, rainy weather conditions, but more safe in weather that does not adversely affect the friction of the roadway surface); and (7) which ADAS systems of the ADAS system set 180 are likely to be engaged while traveling along the particular candidate route.

In some embodiments, the memory 127 stores digital data that describes the automated driving capabilities of the HAV 123. For example, the memory stores ADAS data that describes which ADAS systems are included in the ADAS system set 180 and the autonomous features provided by these ADAS systems. In some embodiments, the ADAS data describes what level of autonomation is provided by the ADAS system set 180 as a whole. For example, the ADAS data describes that the ADAS system set 180 renders the HAV 123 a Level 4 autonomous vehicle.

In some embodiments, the external data 191 is received from one or more electronic services which provide digital data to the optimization system that describes one or more of the external factors. For example, the external factors server 107 is a set of one or more servers and electronic services. In some embodiments, the external factors server 107 provides digital data that describes external factors which are included in the external data 191. For example, the external factors server 107 includes a weather service that provides the weather data 187 that describes the weather that will be experienced while traveling on a particular candidate route. In another example, the external factors server 107 includes a traffic server that provides digital data that describes whether a particular candidate route travels through rural or urban areas, the average driving speeds along the particular candidate route, variations in elevation along the particular candidate route, the types of roadways included in the particular candidate route, etc.

In some embodiments, the HAV 123 is a DSRC-equipped vehicle. A DSRC-equipped vehicle is a vehicle which includes a DSRC radio (e.g., as an element of the communication unit 145) and a DSRC-compliant GPS unit 151. DSRC-equipped vehicles broadcast a BSM message at regular intervals (e.g., once every 0.1 seconds or some other interval which is user configurable). Each BSM message includes DSRC data 605 that describes the vehicle which broadcasted the BSM message, the path of travel of the vehicle (including its historical path), the speed of the vehicle while traveling on the path, which ADAS systems where engaged while traveling on the path, etc. Examples of the DSRC data 605 are depicted in FIGS. 6A and 6B. In some embodiments, the DSRC data 605 received from other DSRC-equipped devices (e.g., other devices including a DSRC radio and a DSRC-compliant GPS unit 151) is included in the external data 191.

In some embodiments, the HAV 123 is traveling on a roadway which includes other DSRC-equipped vehicles such as the second vehicle 124, and these DSRC-equipped vehicles broadcast BSM messages and other DSRC messages which include DSRC data 605. The communication unit 145 of the HAV 123 retrieves these BSM and DSRC messages and provides them to the optimization system 199, which then extracts the DSRC data 605 they contain. This DSRC data 605 is another potential source of external data 191 as described above.

For example, the second vehicle 124 recently traveled along a route that includes similarities to one or more of the candidate routes being considered by the optimization system 199. The similarities may include that the second vehicle 124 traveled along portions of roadways which the HAV 123 would travel if the optimization system 199 selected a particular candidate route included in the set of candidate routes. The second vehicle 124 broadcasts a BSM message including DSRC data 605. The DSRC data 605 describes, among other things, which ADAS systems it had engaged for the different roadway portions it has traveled, including those roadway portions which are the same as those that the HAV 123 would travel if the optimization system 199 were to select a candidate route similar to the route traveled by the second vehicle 124. The optimization system 199 analyzes the DSRC data 605 to determine which ADAS systems the second vehicle 124 engaged, and the geographic locations for when these ADAS systems where engaged. In this way, the DSRC data 605 beneficially enables the optimization system 199 to determine which ADAS systems are likely to be engaged for one or more of the candidate routes, and how long these ADAS systems will be engaged.

In some embodiments, the external data 191 is transmitted to the HAV 123 by one or more other vehicles (such as the second vehicle 124) or one or more roadside units via a wireless message that is transmitted to the HAV 123 via cellular communication or millimeter wave communication. The wireless message may include digital data that describes information similar to the information that is described by the DSRC data 605. In some embodiments, the wireless message is transmitted via LTE-V2V, 3G, 4G, 5G or some other form of cellular communication.

The driver data 193 is digital data that describes the fatigue, impairment, physical condition and mental condition of the driver of the HAV 123. For example, the optimization system 199 receives the internal sensor data 185 as an input and determines the fatigue, impairment, physical condition and mental condition of the driver of the HAV 123 based on the internal sensor data 185.

For example, if the internal sensor data 185 indicates that the drivers eyes are presently closed and have been closed for more than 1 second, then the optimization system 199 determines that the driver is drowsy or asleep and unable to take responsibility for driving the HAV 123, and the driver data 193 describes (1) the condition of the driver and (2) how this condition affects whether the driver can contribute to controlling the operation of the HAV 123 (e.g., how much the driver can contribute to controlling the operation of the HAV 123 based on their condition).

In some embodiments, the condition of the driver described by the driver data 193 limits the driver's availability for taking over control of some or all aspects of the operation of the HAV 123. In some embodiments, controlling some or all aspects of the HAV 123 includes one or more of the following: steering the HAV 123; managing a speed of the HAV (e.g., managing the acceleration of the HAV 123 or managing a braking system of the HAV 123); managing a transmission of the HAV 123; managing a parking brake of the HAV 123; managing the turning signals of the HAV 123; managing the parking of the HAV 123; managing the backing up of the HAV 123; managing any other vehicle function of the HAV 123; and managing any functionality which would otherwise be provided by an ADAS system of the HAV 123 if that ADAS system were engaged.

In another example, the internal sensor data 185 indicates that the driver is steering the HAV 123 in a swaying pattern that indicates that they are drowsy, but not dangerously slow, and the optimization system 199 determines that the driver is drowsy but can operate the HAV 123 for periods of time that do not exceed 1 minute so long as the HAV 123 is not located on a busy road or an urban environment.

Based on the foregoing examples, the driver data 193 describes a diagnosis of the condition of the driver and its effect on the driver's ability to control the operation of the HAV 123 based on the internal sensor data 185. Other examples are possible.

In some embodiments, the memory 127 includes a data set that describes different conditions of the driver and how much the driver can contribute to controlling the operation of the HAV 123 if they are experiencing these conditions. The optimization system 199 compares the internal sensor data 185 to the data set to determine the condition of the driver and how much the driver can contribute to controlling the operation of the HAV 123 if they are experiencing these conditions.

The communication unit 145 transmits and receives data to and from a network 105 or to another communication channel. In some embodiments, the communication unit 145 may include a DSRC transceiver, a DSRC receiver and other hardware or software necessary to make the HAV 123 (or some other device such as the external factors server 107 and the interface device 198) a DSRC-enabled device.

In some embodiments, the communication unit 145 includes a port for direct physical connection to the network 105 or to another communication channel. For example, the communication unit 145 includes a universal serial bus (USB), secure digital (SD), CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The ADAS system set 180 may include one or more advanced driver assistance systems ("ADAS systems"). Examples of ADAS systems included in the ADAS system set 180 include one or more of the following elements of the HAV 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems are also referred to herein as an "autonomous feature" or an "autonomous functionality," respectively. As depicted in FIG. 1A, the autonomous features and autonomous functionality provided by the ADAS systems of the ADAS system set 180 are sufficient to classify the vehicle which includes the optimization system 199 as an HAV.

The interface device 198 includes one or more of the following: a 3D-HUD (see, e.g., FIG. 5); a conventional AR display device such as an AR headset, AR goggles or AR glasses; and any other electronic device of the HAV 123 having an electronic display. Although only one interface device 198 is depicted in FIG. 1A as an element of the HAV, in practice the HAV 123 may include a plurality of interface devices 198.

In some embodiments, the interface device 198 includes one or more of the following example AR display devices: Google™ Glass; CastAR; Moverio BT-200; Meta; Vuzix M-100; Laster SeeThru; Icis; Optinvent ORA-S; GlassUP; Atheer One; K-Glass; and Microsoft™ Hololens.

In some embodiments, the electronic display of the interface device 198 is transparent or substantially transparent so that the driver of the HAV 123 can view the roadway environment or the cabin of the HAV 123 while also viewing the GUIs (or overlays) provided by the optimization system 199 and displayed by the interface device 198. For example, the electronic display or the interface device 198 is transparent of substantially transparent.

In some embodiments, the interface device 198 is configured so that a driver of the HAV 123 can be focused on the driving experience when operating the HAV 123. In some embodiments, the interface device 198 includes one or more internal sensors 159 that monitor the condition of the driver.

Figure 5:
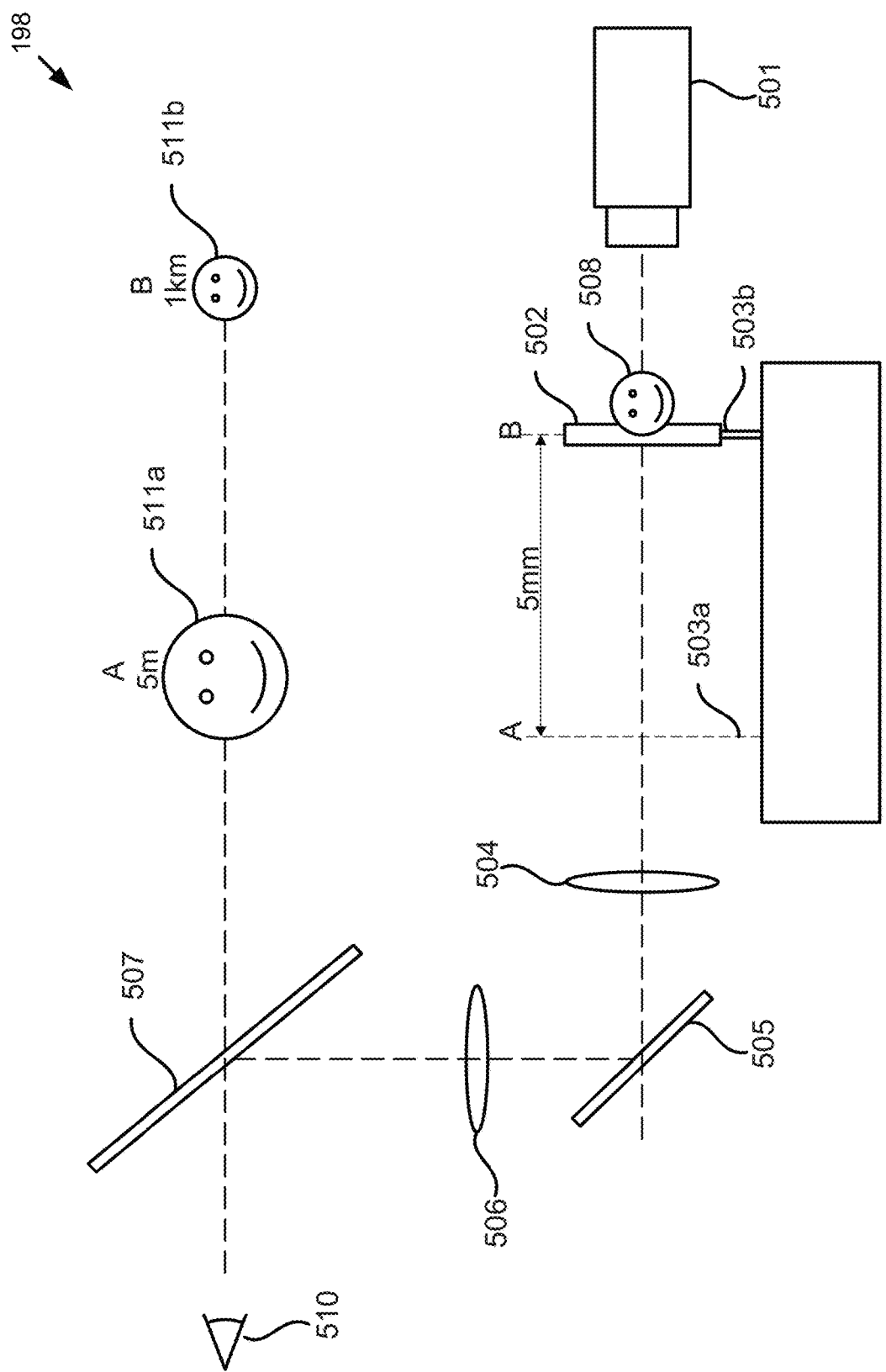
FIG. 5 is a block diagram of a 3D-HUD according to some embodiments.

In some embodiments, the interface device 198 is a 3D-HUD. An example of the 3D-HUD is depicted in FIG. 5. For example, a driver of the HAV 123 may view the 3D-HUD and the 3D-HUD may display a graphical overlay which is described by the graphical data stored on the memory 127. Accordingly, the graphical data may describe one or more three-dimensional graphical overlays which are operable to be displayed by a 3D-HUD.

As described in more detail below, the interface device 198 may include a non-transitory cache or buffer that temporarily stores data that it receives from the optimization system 199. For example, the non-transitory cache or buffer may store graphical data which is predetermined by the optimization system 199.

In some embodiments, the optimization system 199 may include code or routines which, when executed by the processor 125, cause the processor 125 to execute one or more of the steps of the method 300 depicted in FIGS. 3A-3C.

In some embodiments, the optimization system 199 includes code and routines that are operable, when executed by the processor 125, to cause the processor 125 to execute one or more steps of the process 400 described below with reference to FIG. 4.

In some embodiments, the optimization system 199 of the HAV 123 may be implemented using hardware including a field-programmable gate array ("FPGA") or an application-specific integrated circuit ("ASIC"). In some other embodiments, the optimization system 199 may be implemented using a combination of hardware and software. The optimization system 199 may be stored in a combination of the devices (e.g., servers or other devices), or in one of the devices.

The optimization system 199 is described in more detail below with reference to FIGS. 1B, 2, 3A-3C, 4, 5, 6A and 6B.

External Factors Server 107

The external factors server 107 is a processor-based computing device. For example, the external factors server 107 may include one or more of the following types of processor-based computing devices: a personal computer; a laptop; a mainframe; or any other processor-based computing device that is operable to function as a server. The external factors server 107 may include a hardware server.

In some embodiments, the external factors server 107 includes one or more of the following elements: a processor; a non-transitory memory; and a communication unit. These elements of the external factors server 107 are similar to those of the HAV 123. The non-transitory memory also stores code and routines that are operable to provide one or more electronic services which are sources of the external data 191. The processor of the external factors server 107 executes the code and routines stored on the non-transitory memory of the external factors server 107 to provide the one or more electronic services.

Second Vehicle 124

The second vehicle 124 is a vehicle. For example, the second vehicle 124 is one or more of the following types of vehicles: a car; a truck; a sports utility vehicle; a bus; a semi-truck; a drone or any other roadway-based conveyance. In some embodiments, the second vehicle 124 includes one or more ADAS systems such as those described above for the ADAS system set 180. In some embodiments, the second vehicle 124 is a HAV. In some embodiments, the second vehicle 124 is a DSRC-equipped vehicle.

Figure 1B:
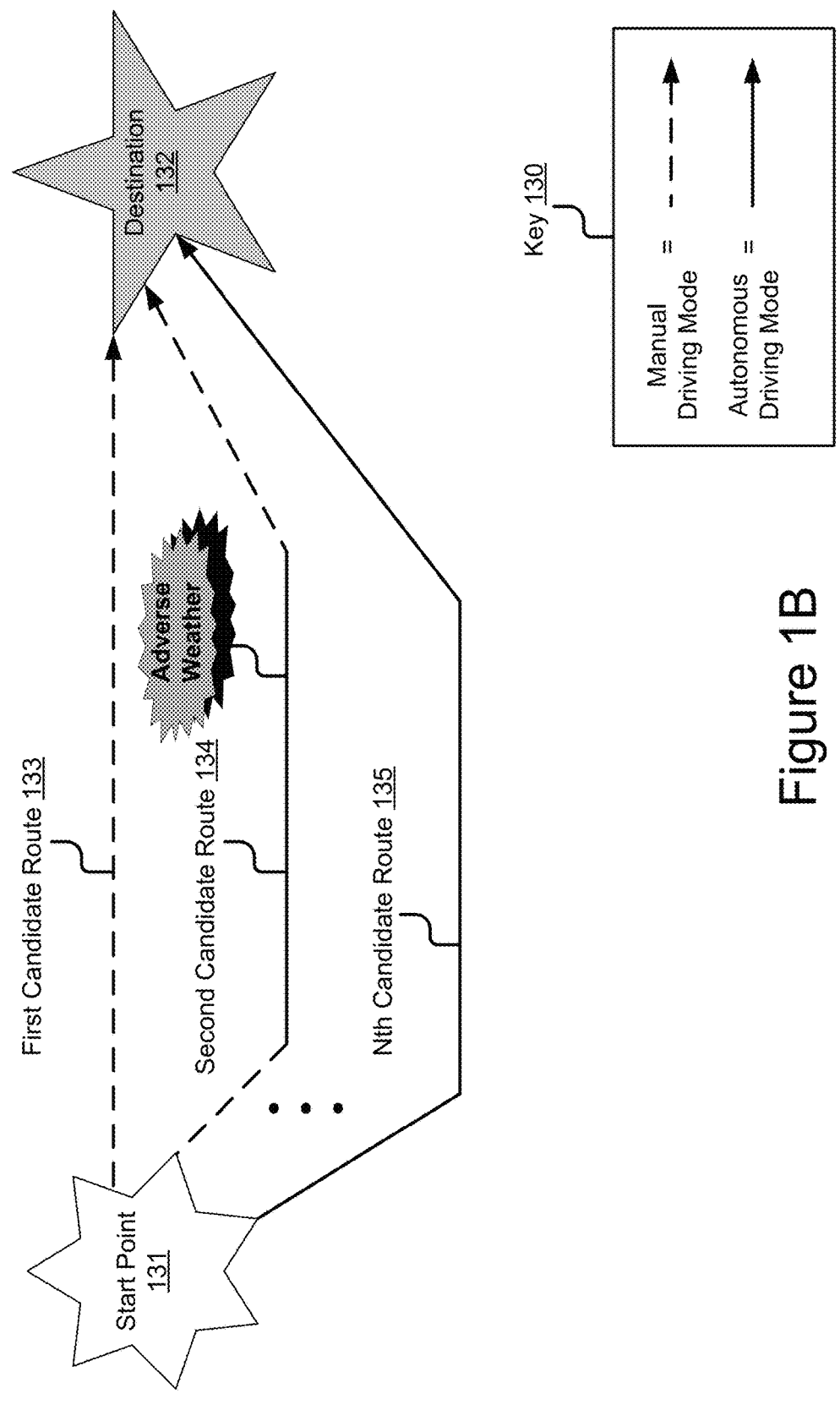
FIG. 1B is a block diagram illustrating an example set of candidate routes according to some embodiments.

Referring now to FIG. 1B, depicted is a block diagram illustrating an example set of candidate routes 129 according to some embodiments. For example, the HAV 123 is located at a geographic location which is the start point 131. The driver of the HAV 123 provides an input to the navigation system 149 which specifies the destination 132. The navigation system 149 outputs a set of candidate routes which, if traveled by the HAV 123, will complete a journey that begins at the start point 131 and ends at the destination 132.

As depicted, the set of candidate routes 129 includes: a first candidate route 133; a second candidate route 134; and an Nth candidate route 135, where "N" indicates a positive whole number.

A key 130 explains the following: a dashed line indicates that the HAV 123 would be in manual driving mode; and solid line indicates that the HAV 123 would be in autonomous driving mode. Autonomous driving mode is a mode of operation for the HAV 123 in which one or more ADAS systems of the ADAS system set 180 are engaged such that the HAV 123 is operating as a Level 3, Level 4 or Level 5 autonomous vehicle as defined by the NHTSA. Manual driving mode is a mode of operation of the HAV 123 in which one or more ADAS systems of the ADAS system set 180 are disengaged such that the HAV 123 is operating as a Level 1 or a Level 2 vehicle as defined by the NHTSA.

For the first candidate route 133, the optimization system 199 includes code and routines that are operable, when executed by the processor 125 of the HAV 123, to cause the processor 125 to analyze the external data 191 for the first candidate route 133 and determine that the external data 191 for the first candidate route 133 indicates that the HAV 123 will not be able to engage in autonomous driving mode for the entirety of the candidate route due to road traffic conditions and other factors adversely affecting the availability or safety of engaging the ADAS systems of the HAV 123.

For the second candidate route 134, the optimization system 199 includes code and routines that are operable, when executed by the processor 125 of the HAV 123, to cause the processor 125 to analyze the external data 191 for the second candidate route 134 and determine that the external data 191 for the second candidate route 134 indicates that the HAV 123 will not be able to engage in autonomous mode at the beginning portion and the end portion of the candidate route due to weather conditions and other factors adversely affecting the availability or safety of engaging the ADAS systems of the HAV 123. In the depicted embodiment, the external data 191 further indicates that the HAV 123 may have to travel slowly when automated driving mode is engaged due to the unfavorable weather conditions.

For the Nth candidate route 135, the optimization system 199 includes code and routines that are operable, when executed by the processor 125 of the HAV 123, to cause the processor 125 to analyze the external data 191 for the Nth candidate route 135 and determine that the external data 191 for the Nth candidate route 135 indicates that the ADAS systems of the HAV 123 will be able to be engaged for the entirety of the route such that the HAV 123 can operate as a Level 3, Level 4 or Level 5 autonomous vehicle for the entirety of the route.

Example Computer System

Figure 2:
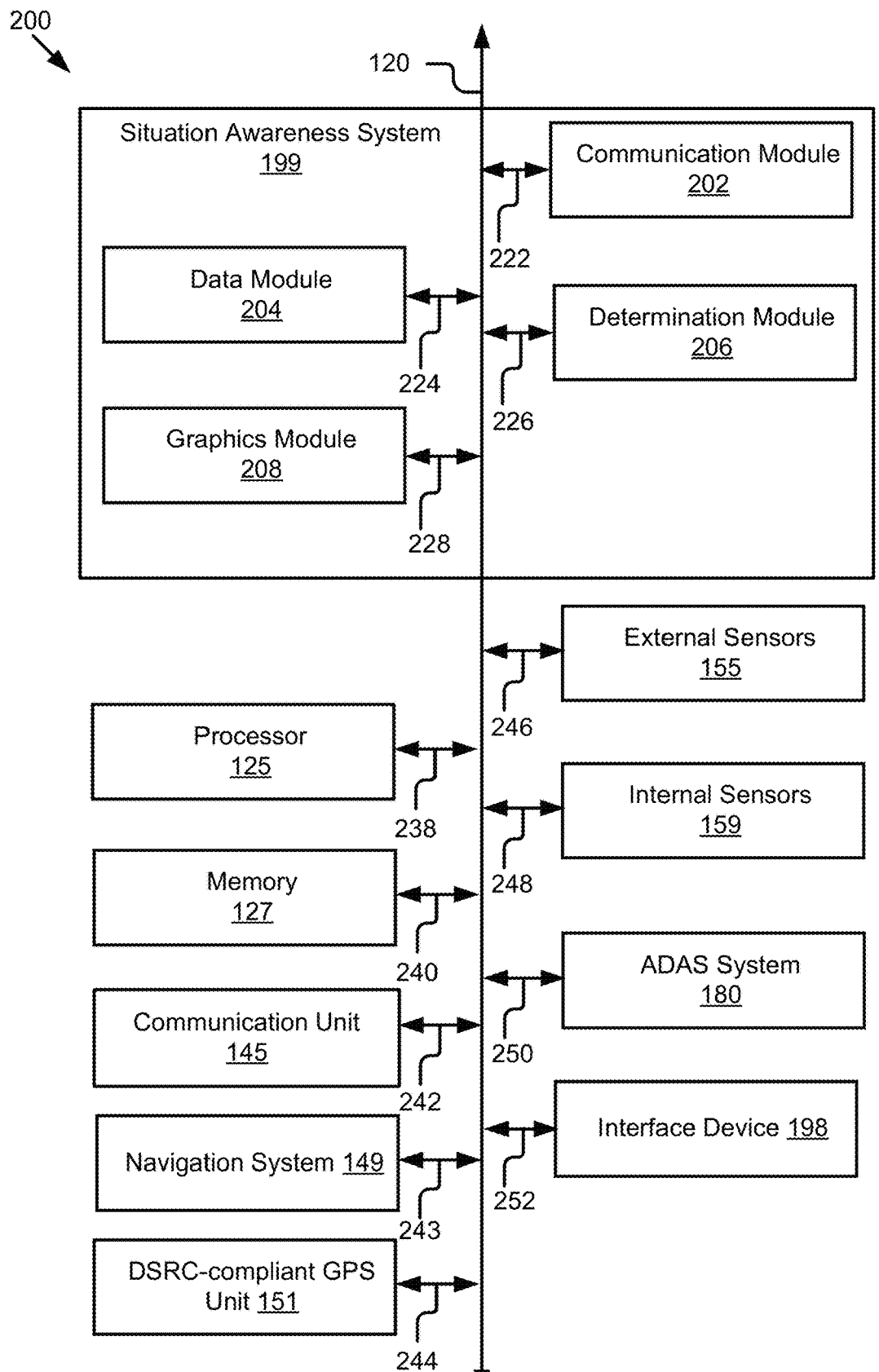
FIG. 2 is a block diagram illustrating an example computer system including the optimization system of an HAV according to some embodiments.

Referring now to FIG. 2, depicted is a block diagram illustrating an example computer system 200 including the optimization system 199 of the HAV 123 according to some embodiments.

In some embodiments, the computer system 200 may include a special-purpose computer system that is programmed to perform one or more steps of a method 300 described below with reference to FIGS. 3A-3C or the process 400 described below with reference to FIG. 4.

In some embodiments, one or more components of the computer system 200 may be part of the external factors server 107.

In some embodiments, the computer system 200 may be an onboard vehicle computer of the HAV 123.

In some embodiments, the computer system 200 may be an ECU, head unit or some other processor-based computing device of the HAV 123.

The computer system 200 may include one or more of the following elements according to some examples: the optimization system 199; the processor 125; the memory 127; the communication unit 145; the navigation system 149, the DSRC-compliant GPS unit 151; the external sensors 155; the internal sensors 159; the ADAS system set 180; and the interface device 198. These components of the computer system 200 are communicatively coupled by the bus 120.

In the illustrated embodiment, the processor 125 is communicatively coupled to the bus 120 via a signal line 238. The memory 127 is communicatively coupled to the bus 120 via a signal line 240. The communication unit 145 is communicatively coupled to the bus 120 via a signal line 242. The navigation system 149 is communicatively coupled to the bus 120 via a signal line 243. The DSRC-compliant GPS unit 151 is communicatively coupled to the bus 120 via a signal line 244. The external sensors 155 are communicatively coupled to the bus 120 via a signal line 246. The internal sensors 159 are communicatively coupled to the bus 120 via a signal line 248. The ADAS system set 180 is communicatively coupled to the bus 120 via a signal line 250. The interface device 198 is communicatively coupled to the bus 120 via a signal line 252.

The following elements of the computer system 200 were described above with reference to FIG. 1A, and so, those descriptions will not be repeated here: the processor 125; the memory 127; the communication unit 145; the navigation system 149; the DSRC-compliant GPS unit 151; the external sensors 155; the internal sensors 159; the ADAS system set 180; and the interface device 198.

The memory 127 may store any of the data described above with reference to FIG. 1A or below with reference to 3A-3C, 4, 5, 6A and 6B. The memory 127 may store any data needed for the computer system 200 to provide its functionality.

The optimization system 199 described herein with reference to FIG. 1A may include code and routines that is operable to engage (or disengage) the ADAS software for the HAV 123 so that this ADAS software and its corresponding ADAS hardware are operable to provide some or all of the functionality of one or more ADAS systems of the ADAS system set 180.

In the illustrated embodiment shown in FIG. 2, the optimization system 199 includes a communication module 202, a data module 204, a determination module 206 and a graphics module 208.

The communication module 202 can be software including routines for handling communications between the optimization system 199 and other components of the computer system 200. In some embodiments, the communication module 202 can be a set of instructions executable by the processor 125 to provide the functionality described below for handling communications between the optimization system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, any of the data stored in the memory 127 or messages described herein. The communication module 202 may send or receive any of the data or messages described herein via the communication unit 145.

In some embodiments, the communication module 202 receives data from components of the computer system 200 and stores the data in the memory 127 (or a buffer or cache of the interface device 198). For example, the communication module 202 receives any of the data described above with reference to the memory 127 from the communication unit 145 (via the network 105) and stores this data in the memory 127 (or a buffer or cache of the interface device 198).

In some embodiments, the communication module 202 may handle communications between components of the optimization system 199. For example, the communication module 202 may transmit one or more of the candidate route data 188, the preference data 189, the external data 191 and the driver data 193 to the determination module 206 (or any other module of the optimization system 199).

The data module 204 can be software including routines for controlling the operation of the external sensors 155 and the internal sensors 159 and generating the external sensor data 183 and the internal sensor data 185. In some embodiments, the data module 204 can be a set of instructions executable by the processor 125 to provide the functionality described herein for generating the external sensor data 183 and the internal sensor data 185 and causing the communication module 202 to provide the external sensor data 183 and the internal sensor data 185 to the determination module 206.

The data module 204 can be software including routines for aggregating the external data 191 from various sources such as the external factors server 107, the external sensors 155, and the DSRC data 605 received from one or more DSRC-enabled devices such as the second vehicle 124. For example, the data module 204 can cause the communication unit 145 to retrieve the weather data 187 and other external data 191 from the external factors server 107. In another example, the data module 204 can retrieve the DSRC data 605 from the memory 127 and then analyze this DSRC data 605 to determine whether it includes information that describes portions of one or more of the candidate routes included in the set of candidate routes, and then generate external data 191 from this DSRC data 605 if it describes portions of one or more of the candidate routes.

In some embodiments, the data module 204 is software including routines for receiving preference data 189 from a GUI generated by the graphics module 208 and then storing the preference data 189 in the memory 127.

The data module 204 receives external sensor data 183 from the external sensors 155 or retrieves the external sensor data 183 from the memory 127. For example, the data module 204 receives images of the road in front of the HAV 123.

The data module 204 receives internal sensor data 185 from the internal sensors 159 or retrieves the internal sensor data 185 from the memory 127. For example, the data module 204 receives images of the driver or the objects being viewed by the driver.

In some embodiments, the data module 204 is software including routines for controlling the operation of the DSRC-compliant GPS unit 151 and causing the GPS data 186 to be received by the DSRC-compliant GPS unit 151. In some embodiments, the data module 204 can be a set of instructions executable by the processor 125 to provide the functionality described herein for retrieving the GPS data 186 and causing the communication module 202 to provide the GPS data 186 to the determination module 206.

In some embodiments, the data module 204 is stored in the memory 127 of the computer system 200 and can be accessible and executable by the processor 125. The data module 204 may be adapted for cooperation and communication with the processor 125 and other components of the computer system 200 via signal line 224.

The determination module 206 can be software including routines for determining the driver data 193 based on the internal sensor data 185. For example, the memory 127 includes a data set that describes different conditions of the driver and how much the driver can contribute to controlling the operation of the HAV 123 if they are experiencing these conditions. The determination module 206 compares the internal sensor data 185 to the data set to determine the condition of the driver and how much the driver can contribute to controlling the operation of the HAV 123 if they are experiencing these conditions. The determination module 206 may then cause the communication module 202 to store the driver data 193 on the memory 127 of the computer system 200.

In some embodiments, the determination module 206 is software including routines for receiving the candidate route data 188, the preference data 189, the external data 191 and the driver data 193 from the communication module 202 and then selecting a candidate route from the set of candidate routes as described below with reference to FIGS. 3A, 3B and 3C.

In some embodiments, the determination module 206 can be stored in the memory 127 of the computer system 200 and can be accessible and executable by the processor 125. The determination module 206 may be adapted for cooperation and communication with the processor 125 and other components of the computer system 200 via signal line 226.

The graphics module 208 can be software including routines for providing graphical data to the interface device 198 and causing the interface device to display a GUI which is used to receive inputs from a driver that specifies the information described by the preference data 189. In some embodiments, the graphics module 208 can be stored in the memory 127 of the computer system 200 and can be accessible and executable by the processor 125. The graphics module 208 may be adapted for cooperation and communication with the processor 125 and other components of the computer system 200 via signal line 228.

Example Method

Referring now to FIGS. 3A-3C, depicted is a flow diagram of a method 300 for optimizing a selection of a candidate route from among the set of candidate routes according to some embodiments. One or more of the steps described herein for the method 300 may be executed by one or more computer systems 200.

Referring now to FIG. 3A. At step 305, an optimization system causes the DSRC-compliant GPS system of the HAV to retrieve or generate GPS data describing a start point for the HAV. In some embodiments, the GPS system and the GPS data are compliant with a DSRC standard. For example, the GPS system describes the start point with an accuracy of plus or minus 1.5 meters relative to the actual start point of the HAV in the real-world.

At step 310, a driver of the vehicle specifies a destination. A trip by the HAV between the start point and the destination are referred to herein as a "journey."

At step 315, the optimization system causes a navigation system of the HAV to generate a set of candidate routes for traveling between the start point and the destination. Candidate route data is digital data that describes the set of candidate routes. The optimization system stores the candidate route data in the memory of the HAV.

At step 320, the communication unit of the HAV receives external data from the network for each of the candidate routes included in the set of candidate routes. The optimization system stores the external data in the memory of the HAV. The external data is digital data that describes, for each candidate route, one or more of the following: (1) the autonomous features which may be triggered by the sensor data that the HAV will record while traveling on the candidate route [e.g., based on which ADAS functionality have been triggered by other vehicles while traveling portions of this candidate route as described in DSRC messages received from other vehicles]; (2) road information affecting when automated driving is safe or possible along a particular route; (3) weather conditions affecting when automated driving is safe or possible along a particular route; (4) road traffic conditions affecting when automated driving is safe or possible along a particular route; and (5) lighting conditions for the road environment which affect whether automated driving is safe or possible along a particular route or all routes. An autonomous feature is the functionality provided by one or more ADAS systems of the HAV.

At step 325, the optimization system causes the internal sensors of the HAV to record internal sensor data. The internal sensor data is digital data describing a condition of the driver. The optimization system analyzes the internal sensor data to determine the driver data. The driver data is digital data that describes (1) the condition of the driver and (2) how this condition affects whether the driver can contribute to controlling the operation of the HAV 123 (e.g., how much the driver can contribute to controlling the operation of the HAV 123 based on their condition). For example, the memory of the HAV includes a data set that describes different conditions of the driver and how much the driver can contribute to controlling the operation of the HAV 123 if they are experiencing these conditions.

Referring now to FIG. 3B. At step 330, the optimization system causes an interface device of the HAV to depict a GUI which is operable to receive inputs from the driver describing their preference for how often the HAV should utilize automated driving mode versus requiring the driver to operate the HAV without any automated driving mode being engaged and which types of autonomous features the driver prefers to be active. The optimization system receives the inputs from the GUI and stores preference data in the memory of the HAV. The preference data is digital data that describes the driver's preference for how often the HAV should utilize automated driving mode versus requiring the driver to operate the HAV without any automated driving mode being engaged, the particular autonomous features provided by the ADAS systems of the HAV and which autonomous features the driver prefers to be active.

At step 335, the optimization system analyses the driver data and the preference data to determine an optimal degree of automation for traveling between the start point and the destination based on the condition of the driver and the preferences of the driver. The optimal degree of automation is digital data that describes how much automated driving is optimal for traveling between the start point and the end point of the journey based on the condition of the driver and the preferences of the driver. In some embodiments, the optimal degree of automation is expressed as one or more of the following: a percentage (e.g., X % of a journey where "X" is a positive whole number); and an amount of time for the journey (e.g., X minutes where "X" is a positive whole number). The optimal degree of automation is stored by the optimization system in the memory of the HAV. See, for example, FIG. 4 and the optimal degree of automation data 405.

At step 340, the optimization system analyses one or more of the following types of digital data to determine a possible degree of automation for the candidate routes included in the set of candidate routes based on one or more of the following: the candidate route data; the external data; the driver data; and the preference data. A possible degree of automation is digital data that describes, for a particular candidate route, how much automated driving is possible for traveling between the start point and the destination based on the external data for that particular candidate route, the condition of the driver as described by the driver data and the preferences of the driver as described by the preference data. In some embodiments, each candidate route from the set of candidate routes is assigned its own value for the possible degree of automation. In some embodiments, the possible degree of automation for each candidate route is expressed as a percentage (e.g., X % of a journey where "X" is a positive whole number) or an amount of time for the journey (e.g., X minutes where "X" is a positive whole number). See, for example, FIG. 4 and the first, second and Nth possible degrees of automation data 410A, 410B . . . 410N.

At step 345, the optimization system compares the value for the optimal degree of automation to the values for the possible degree of automation for each candidate route to determine which of the routes is a best available fit for the optimal degree of optimization. The best available fit is the candidate route having a value for the possible degree of automation which is closest to the value for the optimal degree of automation. If a tie is present, then the best available fit is the route which has the shortest duration or other factors which are desirable to the driver.

Referring now to FIG. 3C. At step 350, the optimization system selects the candidate route which is the best available fit as the current navigation route for the HAV. This route is now referred to as the "selected route." The optimization system provides the selected route to the automated driving system of the HAV and causes the automated driving system to operate the HAV so that the HAV travels on this selected route for the journey. In some embodiments, the optimization system may constantly re-evaluate the set of candidate routes based on newly available analysis data and may select a new route from this set if the new analysis data warrants a change.

Figure 4:
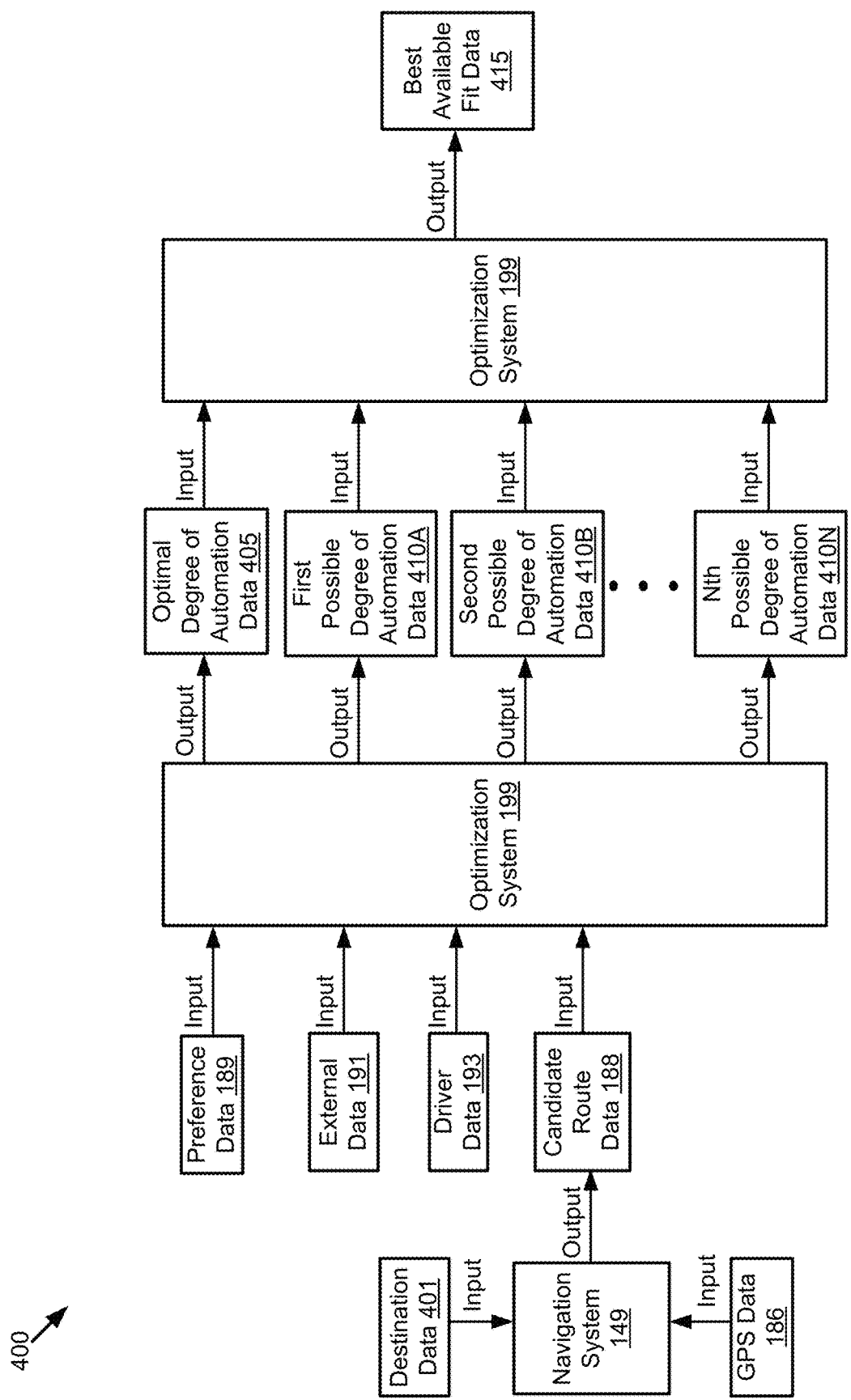
FIG. 4 is a block diagram illustrating a process for the optimization system to optimize a selection of a candidate route from among the set of candidate routes according to some embodiments.

Referring now to FIG. 4, depicted is a block diagram illustrating a process 400 for the optimization system to optimize a selection of a candidate route from among the set of candidate routes according to some embodiments.

A navigation system 149 receives GPS data 186 describing a start point for a journey as an input. The navigation system 149 also receives destination data 401 describing a destination for the journey as an input. Based on these inputs, the navigation system 149 outputs candidate route data 188 describing a set of candidate routes for completing the journey. The set of candidate routes includes N candidate routes, where "N" is a positive whole number greater than two.

The optimization system 199 receives the following types of digital data as inputs: the preference data 189; the external data 191; the driver data 193; and the candidate route data 188. Based on these inputs, the optimization system 199 outputs the following types of digital data: optimal degree of automation data 405; first possible degree of automation 410A; second possible degree of automation 410B; and Nth possible degree of automation data 410N (where N is the same number as the total number of candidate routes included in the set of candidate routes).

The optimal degree of automation data 405 describes an optimal degree of automation for the journey. The optimal degree of automation describes how much automated driving is optimal for traveling between the start point and the end point of the journey based on the condition of the driver and the preferences of the driver. In other words, how much the HAV 123 should optimally be in autonomous driving mode as described above with reference to FIG. 1B. In some embodiments, the optimal degree of automation is expressed as one or more of the following: a percentage (e.g., X % of a journey where "X" is a positive whole number); and an amount of time for the journey (e.g., X minutes where "X" is a positive whole number). The optimal degree of automation data 405 is stored by the optimization system in the memory of the HAV.

The set of candidate routes includes N routes. The optimization system 199 generates digital data describing a possible degree of automation for each of these N routes. The first possible degree of automation data 410A is digital data that describes, for the first candidate route, how much automated driving is possible for traveling between the start point and the destination based on the external data 191 for the first candidate route, the condition of the driver as described by the driver data 193 and the preferences of the driver as described by the preference data 189. The second possible degree of automation data 410B is digital data that describes, for the second candidate route, how much automated driving is possible for traveling between the start point and the destination based on the external data 191 for the second candidate route, the condition of the driver as described by the driver data 193 and the preferences of the driver as described by the preference data 189. The Nth possible degree of automation data 410N is digital data that describes, for the Nth candidate route, how much automated driving is possible for traveling between the start point and the destination based on the external data 191 for the Nth candidate route, the condition of the driver as described by the driver data 193 and the preferences of the driver as described by the preference data 189.

In some embodiments, each candidate route from the set of candidate routes is assigned its own value for the possible degree of automation and this value is described by the first possible degree of automation data 410A, the second possible degree of automation data 410B and the Nth possible degree of automation data 410N. In some embodiments, the possible degrees of automation for each candidate route is expressed as a percentage (e.g., X % of a journey where "X" is a positive whole number) or an amount of time for the journey (e.g., X minutes where "X" is a positive whole number).

The optimization system 199 receives the following types of digital data as an input: the optimal degree of automation data 405; the first possible degree of automation data 410A; the second possible degree of automation data 410B; and the Nth possible degree of automation data 410N. Based on these inputs, the optimization system 199 outputs the best available fit data 415.

For example, the optimization system 199 compares the value for the optimal degree of automation to the values for the possible degrees of automation for each candidate route to determine which of the routes is a best available fit for the optimal degree of optimization. The best available fit data 415 is digital data that describes the best available fit. The best available fit is the candidate route having a value for the possible degree of automation which is closest to the value for the optimal degree of automation. If a tie is present, then the best available fit is the route which has the shortest duration or other factors which are desirable to the driver.

Example 3D-HUD

Referring to FIG. 5, depicted is a block diagram illustrating an interface device 198 in embodiments where the interface device 198 is a 3D-HUD.

In some embodiments, the 3D-HUD includes a projector 501, a movable screen 502, a screen-driving unit 503, an optical system (including lenses 504, 506, a reflector 505, etc.). The projector 501 may be any kind of projector such as a digital mirror device (DMD) project, a liquid crystal projector. The projector 501 projects an image (graphic) 508 on the movable screen 502. The image 508 may include a graphical overlay.

The movable screen 502 includes a transparent plate and so the light of the projected image transmits through the movable screen 502 to be projected on the windshield 507 of the HAV 123. The image projected on the windshield 507 is perceived by a driver 510 as if it is a real object (shown as 511a, 511b) that exists in the three-dimensional space of the real-world, as opposed to an object that is projected on the windshield.

In some embodiments, the 3D-HUD is capable of controlling the direction of the image relative to the driver 510 (in other words, the image position in the windshield) by adjusting the projection position on the screen 502. Further the screen 502 is movable by the screen-driving unit 503 in the range between the positions 503a and 503b. Adjusting the position of the movable screen 502 can vary the depth (distance) of the projected image from the driver 510 in the real-world. In one example, the movable range of the screen 502 (distance between positions 503a and 503b) may be 5 mm, which correspond to from 5 m away to infinity in the real-world. The use of the 3D-HUD allows the driver 510 to perceive the projected image exist in the real-world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D-HUD depicted in FIG. 5 is provided by way of example. Other examples are possible. These examples may include heads-up displays having more or less complexity than the 3D-HUD depicted in FIG. 5. For example, it is anticipated that in the future there will be heads-up displays that do not require movable parts such as the movable screen 502. For example, a static screen that does not move may be deployed. The heads-up display deployed may not be a two-dimensional heads-up display unit. In some embodiments, the optimization system 199 and the graphical overlay is designed to be operable with such components.

Example DSRC Data 605

Referring now to FIG. 6A, depicted is a block diagram illustrating an example of the DSRC data 605 according to some embodiments.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages.

In some embodiments, a DSRC-compliant GPS unit is operable to identify, monitor and track its two-dimensional position within 1.5 meters of its actual position 68% of the time under an open sky.

The regular interval for transmitting BSM message may be user configurable. In some embodiments, a default setting for this interval may be transmitting the BSM message every 0.10 seconds or substantially every 0.10 seconds.

A BSM message may be broadcasted over the 5.9 GHz DSRC band. DSRC range may be substantially 1,000 meters. In some embodiments, DSRC range may include a range of substantially 100 meters to substantially 1,000 meters.

Referring now to FIG. 6B, depicted is a block diagram illustrating an example of DSRC data 605 according to some embodiments.

The DSRC data 605 may include two parts. These two parts may include different DSRC data 605 as shown in FIG. 6B.

Part 1 of the DSRC data 605 may digitally describe one or more of the following: vehicle position; vehicle motion data; and vehicle size. The vehicle position data may describe, among other things, the various geographic locations of the vehicle and the times when the vehicle was present at these geographic locations such that the portions of the roadways traveled by the vehicle which generated the DSRC data 605 can be discerned from the vehicle position data. The vehicle motion data may describe, among other things, the whether any ADAS systems were activated and the times when these ADAS systems where activated. The combination of the vehicle position data and the vehicle motion data is analyzable to determine the portions of the roadways traveled by the vehicle which generated by the DSRC data 605 and whether any ADAS systems were activated by the vehicle while traveling on these portions of the roadway.

Part 2 of the DSRC data 605 may include a variable set of data elements drawn from a list of optional elements. Some of the DSRC data 605 included in Part 2 are selected based on event triggers, e.g., anti-locking brake system ("ABS") being activated may trigger DSRC data 605 relevant to the ABS system of the vehicle.

In some embodiments, some of the elements of Part 2 are transmitted less frequently in order to conserve bandwidth.

In some embodiments, the DSRC data 605 included in a BSM message includes current snapshots of a vehicle traveling along a roadway system.

In some embodiments, the DSRC data 605 includes a unique identifier of the vehicle which transmitted the BSM message including the DSRC data 605, as well as the geographic location of this vehicle, such that the optimization system 199 includes code and routines operable to accurately determine the identity and location of the vehicle described by the DSRC data 605.

Part 2 also includes digital data that describes which specific ADAS systems where activated (ADAS activation data) along various points of the path history of the vehicle as described by the vehicle path history data. For example, Part 2 includes digital data that describes, among other things, the different ADAS systems which were activated and the times when these ADAS systems where activated (e.g., the ADAS activation data). The path history data describes the historical path of the vehicle and the times when the vehicle was present at different points in this path. The combination of the vehicle path history data and the ADAS activation data is analyzable to determine the portions of the roadways traveled by the vehicle and the ADAS systems which were activated by the vehicle while traveling on these portions of the roadway.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method implemented by an autonomous vehicle which provides an automated driving service to a driver of the autonomous vehicle, the method comprising:
receiving, via a user interface, preference data that describes which particular autonomous features the driver wants to be active;
generating a set of candidate routes for a journey;
aggregating external data digitally describing one or more external factors which limit an availability of the automated driving service while traveling along candidate routes included in the set of candidate routes, wherein each candidate route in the set of candidate routes has its own external data;
determining a first value for an optimal degree of automation for traveling, by the driver, the journey based on the preference data describing which particular autonomous features the driver wants to be active;
determining a plurality of second values each indicating a possible degree of automation for each candidate route included in the set of candidate routes based on the external data; and
selecting an optimum route from the set of candidate routes according to the first value and the plurality of second values.

2. The method of claim 1, wherein the first value is determined based on a condition of the driver and one or more preferences of the driver related to the condition.

3. The method of claim 2, wherein the condition of the driver limits an availability of the driver for taking over control of some or all aspects of operating the autonomous vehicle.

4. The method of claim 3, wherein operating the autonomous vehicle includes steering the autonomous vehicle.

5. The method of claim 3, wherein operating the autonomous vehicle includes managing an acceleration of the autonomous vehicle.

6. The method of claim 3, wherein the operating the autonomous vehicle includes managing a braking system of the autonomous vehicle.

7. The method of claim 2, wherein the one or more preferences of the driver include preferences for how frequently the driver wants to receive the automated driving service from the autonomous vehicle.

8. The method of claim 1, wherein the autonomous vehicle is a highly autonomous vehicle.

9. A system of an autonomous vehicle which provides an automated driving service to a driver of the autonomous vehicle, the system comprising:
an onboard vehicle computer system including a non-transitory memory storing computer code which, when executed by the onboard vehicle computer system causes the onboard vehicle computer system to:
receive, via a user interface, preference data that describes which particular autonomous features the driver wants to be active;
generate a set of candidate routes for a journey;
aggregate external data digitally describing one or more external factors which limit an availability of the automated driving service while traveling along candidate routes included in the set of candidate routes, wherein each candidate route in the set of candidate routes has its own external data;
determine a first value for an optimal degree of automation for traveling, by the driver, the journey based on the preference data describing which particular autonomous features the driver wants to be active;
determine a plurality of second values each indicating a possible degree of automation for each candidate route included in the set of candidate routes based on the external data; and
select an optimum route from the set of candidate routes according to the first value and the plurality of second values.

10. The system of claim 9, wherein the first value is determined based on a condition of the driver and one or more preferences of the driver related to the condition.

11. The system of claim 10, wherein the condition of the driver limits an availability of the driver for taking over control of some or all aspects of operating the autonomous vehicle.

12. The system of claim 11, wherein operating the autonomous vehicle includes steering the autonomous vehicle.

13. The system of claim 11, wherein operating the autonomous vehicle includes managing an acceleration of the autonomous vehicle.

14. The system of claim 11, wherein the operating the autonomous vehicle includes managing a braking system of the autonomous vehicle.

15. The system of claim 10, wherein the one or more preferences of the driver include preferences for how frequently the driver wants to receive the automated driving service from the autonomous vehicle.

16. The system of claim 9, wherein the autonomous vehicle is a highly autonomous vehicle.

17. A computer program product comprising a non-transitory memory of an onboard vehicle computer system of an autonomous vehicle which provides an automated driving service to a driver of the autonomous vehicle, the computer system storing computer-executable code that, when executed by the onboard vehicle computer system, causes the onboard vehicle computer system to:
receive, via a user interface, preference data that describes which particular autonomous features the driver wants to be active;
generate a set of candidate routes for a journey;
aggregate external data digitally describing one or more external factors which limit an availability of the automated driving service while traveling along candidate routes included in the set of candidate routes, wherein each candidate route in the set of candidate routes has its own external data;
determine a first value for an optimal degree of automation for traveling, by the driver, the journey based on the preference data describing which particular autonomous features the driver wants to be active;
determine a plurality of second values each indicating a possible degree of automation for each candidate route included in the set of candidate routes based on the external data; and
select an optimum route from the set of candidate routes according to the first value and plurality of second values.

18. The computer program product of claim 17, wherein the first value is determined based on a condition of the driver and one or more preferences of the driver related to the condition.

19. The computer program product of claim 18, wherein the condition of the driver includes a condition which limits an availability of the driver for taking over control of some or all aspects of operating the autonomous vehicle.

20. The computer program product of claim 19, wherein operating the autonomous vehicle includes steering the autonomous vehicle.

21. The computer program product of claim 19, wherein operating the autonomous vehicle includes managing a speed of the autonomous vehicle.

22. The computer program product of claim 18, wherein the one or more preferences of the driver include preferences for how frequently the driver wants to receive the automated driving service from the autonomous vehicle.

23. The computer program product of claim 17, wherein the autonomous vehicle is a highly autonomous vehicle.

* * * * *